(12) United States Patent
Jeon et al.

(10) Patent No.: US 7,942,160 B2
(45) Date of Patent: May 17, 2011

(54) VALVES AND PUMPS FOR MICROFLUIDIC SYSTEMS AND METHOD FOR MAKING MICROFLUIDIC SYSTEMS

(75) Inventors: Noo Li Jeon, Irvine, CA (US); Daniel T. Chiu, Seattle, WA (US); Christopher J. Wargo, Highland Park, NJ (US); Insung S. Choi, Yuseong-gu (KR); Hongkai Wu, Palo Alto, CA (US); Janelle R. Anderson, Toronto (CA); George M. Whitesides, Newton, MA (US); J. Cooper McDonald, Somerville, MA (US); Steven J. Metallo, Silver Spring, MD (US); Howard A. Stone, Brookline, MA (US)

(73) Assignee: President and Fellows of Harvard College, Cambridge, MA (US)

( * ) Notice: Subject to any disclaimer, the term of this patent is extended or adjusted under 35 U.S.C. 154(b) by 1949 days.

(21) Appl. No.: 10/867,151

(22) Filed: Jun. 14, 2004

(65) Prior Publication Data
US 2004/0228734 A1 Nov. 18, 2004

Related U.S. Application Data

(63) Continuation of application No. 10/041,718, filed on Jan. 8, 2002, now Pat. No. 6,767,194.

(60) Provisional application No. 60/260,221, filed on Jan. 8, 2001, provisional application No. 60/327,430, filed on Oct. 5, 2001, provisional application No. 60/331,856, filed on Nov. 20, 2001.

(51) Int. Cl.
*F16K 15/03* (2006.01)
*F16K 15/04* (2006.01)

(52) U.S. Cl. ............. 137/15.19; 137/613; 137/859; 137/533.11; 137/855

(58) Field of Classification Search .......... 251/331; 137/613, 843, 859, 533.11, 15.19, 855
See application file for complete search history.

(56) References Cited

U.S. PATENT DOCUMENTS 3,556,138 A * 1/1971 D'Urso ............... 137/512.15
(Continued)

FOREIGN PATENT DOCUMENTS

EP 0 706 004 A2 4/1996
(Continued)

OTHER PUBLICATIONS

Jeon, N.L., et al., "Design and fabrication of integrated passive valves and pumps for flexible polymer 3D microfluidic systems," *Biomedical Microdevices*, vol. 4, pp. 117-121 (2002).

(Continued)

*Primary Examiner* — Kevin L Lee
(74) *Attorney, Agent, or Firm* — Wolf, Greenfield & Sacks, P.C.; Timothy J. Oyer

(57) ABSTRACT

The present invention relates to microfluidic systems, including valves and pumps for microfluidic systems. The valves of the invention include check valves such as diaphragm valves and flap valves. Other valves of the invention include one-use valves. The pumps of the present invention include a reservoir and at least two check valves. The reservoir may be of variable volume. The present invention also relates to a flexible microfluidic system. The present invention additionally relates to a method of making microfluidic systems including those of the present invention. The method includes forming a microfluidic system on a master, connecting a support to the microfluidic system and removing the microfluidic system from the master. The support may remain connected to the microfluidic system or the microfluidic system may be transferred to another substrate. The present invention further relates to a method of manipulating a flow of a fluid in a microfluidic system. This method includes initiating fluid flow in a first direction and inhibiting fluid flow in a second direction and may be practiced with the valves of the present invention.

31 Claims, 18 Drawing Sheets

U.S. PATENT DOCUMENTS

| | | | |
|---|---|---|---|
| 4,823,990 A * | 4/1989 | Roggenburg et al. | 222/207 |
| 5,171,132 A | 12/1992 | Miyazaki et al. | |
| 5,277,556 A | 1/1994 | van Lintel | |
| 5,288,214 A | 2/1994 | Fukuda et al. | |
| 5,529,465 A | 6/1996 | Zengerle et al. | |
| 5,839,467 A * | 11/1998 | Saaski et al. | 137/501 |
| 5,863,801 A | 1/1999 | Southgate et al. | |
| 5,962,081 A | 10/1999 | Ohman et al. | |
| 5,976,336 A | 11/1999 | Dubrow et al. | |
| 6,136,212 A | 10/2000 | Mastrangelo et al. | |
| 6,210,986 B1 | 4/2001 | Arnold et al. | |
| 6,227,824 B1 | 5/2001 | Stehr | |
| 6,261,066 B1 | 7/2001 | Linnemann et al. | |
| 6,306,273 B1 | 10/2001 | Wainright et al. | |
| 6,318,970 B1 | 11/2001 | Backhouse | |
| 6,406,605 B1 * | 6/2002 | Moles | 204/601 |
| 6,408,878 B2 | 6/2002 | Unger et al. | |
| 6,413,401 B1 | 7/2002 | Chow et al. | |
| 6,431,212 B1 * | 8/2002 | Hayenga et al. | 137/855 |
| 6,527,003 B1 | 3/2003 | Webster | |
| 6,554,591 B1 | 4/2003 | Dai et al. | |
| 6,644,944 B2 * | 11/2003 | Karp | 417/566 |
| 6,739,576 B2 * | 5/2004 | O'Connor et al. | 251/129.14 |
| 6,749,407 B2 * | 6/2004 | Xie et al. | 417/413.2 |
| 6,767,194 B2 * | 7/2004 | Jeon et al. | 251/129.14 |
| 6,921,253 B2 * | 7/2005 | Shuler et al. | 417/559 |
| 6,953,058 B2 * | 10/2005 | Fernandes et al. | 137/832 |
| 7,090,471 B2 * | 8/2006 | Xie et al. | 137/607 |
| 7,111,635 B2 * | 9/2006 | Beebe et al. | 137/14 |
| 2002/0187560 A1 | 12/2002 | Pezzuto et al. | |
| 2003/0015244 A1 | 1/2003 | Ismagilov et al. | |
| 2003/0075445 A1 | 4/2003 | Woudenberg et al. | |
| 2003/0116738 A1 | 6/2003 | O'Connor et al. | |

FOREIGN PATENT DOCUMENTS

| | | |
|---|---|---|
| WO | WO 97/01055 A1 | 1/1997 |
| WO | WO 98/00707 A1 | 1/1998 |
| WO | WO 00/62931 A1 | 10/2000 |
| WO | WO 02/068823 A1 | 9/2002 |

OTHER PUBLICATIONS

Unger, et al, "Monolithic Microfabricated Valves and Pumps by Multilayer Soft Lithography," *Science*, vol. 288, pp. 113-116 (2000).

International Search Report, from corresponding International Application No. PCT/US02/00293, mailed Sep. 4, 2002.

* cited by examiner

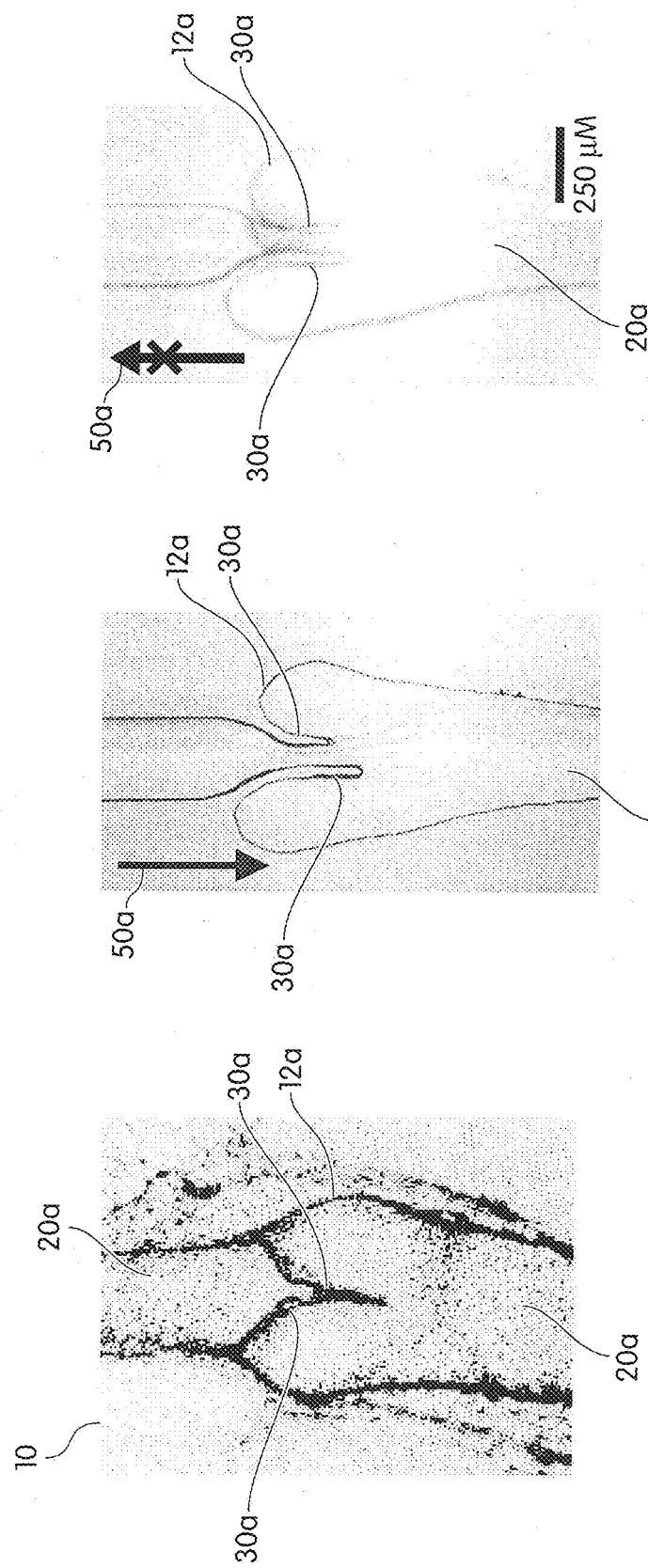

VALVES AND PUMPS FOR MICROFLUIDIC SYSTEMS AND METHOD FOR MAKING MICROFLUIDIC SYSTEMS

This patent application is a continuation application of U.S. patent application Ser. No. 10/041,718, filed Jan. 8, 2002 now U.S. Pat. No. 6,767,194, which is incorporated herein by reference, and claims priority to U.S. Patent Application No. 60/260,221, filed Jan. 8, 2001, U.S. Patent Application No. 60/327,430, filed Oct. 5, 2001 and U.S. Patent Application No. 60/331,856, filed Nov. 20, 2001.

This invention was sponsored by NSF Grant Nos. ECS-9729405, ECS-0004030, MRSEC DMR-9809363 and AFOSR/SPAWAR Grant No. N66001-98-1-8915. The government has certain rights in the invention.

FIELD OF THE INVENTION

The present invention relates to microfluidic systems, including flexible microfluidic systems and valves and pumps for microfluidic systems. The present invention also relates to a method of making a microfluidic system suitable for use with a polymeric material.

BACKGROUND OF THE INVENTION

Microfluidic systems are flow systems miniaturized to dimensions as small as a few micrometers (μm). Such systems present challenges in both their design and manufacture. For example, at the level of miniaturization of typical microfluidic systems, normal fluid flow principles may be less significant than surface tension.

Recent developments in microfluidic systems have been motivated in large part by the possibility of fabricating compact, integrated devices for analytical functions such as genomic analysis, diagnosis and sensing.

SUMMARY OF THE INVENTION

According to one embodiment of the present invention, a microfluidic system is provided including a fluid path, an inlet and an outlet to the fluid path, and a first closing member disposed along the fluid path between the inlet and the outlet. In this embodiment of the invention, the fluid path has a cross-sectional dimension of less than about 500 μm.

According to another embodiment of the present invention, a valve having an open position and a closed position is provided. The valve includes a fluid path and an inlet and an outlet to the fluid path. A flexible diaphragm having an opening is disposed along the fluid path between the inlet and the outlet to the fluid path. In this embodiment of the invention, a seat is constructed and arranged such that, when the valve is in the closed position, the seat obstructs the opening and supports the flexible diaphragm around at least the periphery of the opening.

According to another embodiment of the present invention, a microfluidic pump is provided including a fluid path, an inlet to the fluid path and an outlet to the fluid path. A first closing member and a second closing member are each disposed along the fluid path between the inlet and the outlet, and a reservoir having a variable volume is disposed along the fluid path between the first closing member and the second closing member. In this embodiment of the invention, the fluid path has a cross-sectional dimension of less than about 500 μm.

According to another embodiment of the present invention, a microfluidic system is provided including a flexible support, a flexible material connected to the flexible support, and a fluid path within the flexible material having a cross-sectional dimension of less than about 500 μm.

According to a further embodiment of the present invention, a method for making a microfluidic system is provided. The method includes providing a master corresponding to the microfluidic system, forming the microfluidic system on the master, connecting a support to the microfluidic system and removing the microfluidic system from the master.

According to another embodiment of the present invention, a method for opening a microfluidic valve is provided. The method includes providing a microfluidic valve and a flow of a fluid through a fluid path. The microfluidic valve includes the fluid path, an inlet and an outlet to the fluid path, and a first closing member disposed along the fluid path between the inlet and the outlet. The method further includes deflecting the closing member with the flow from a closed position to an open position without the closing member sliding against any portion of the microfluidic valve. In this embodiment of the invention, the fluid path has a cross-sectional dimension of less than about 500 μm.

According to another embodiment of the present invention, a method for manipulating a flow of a fluid in a microfluidic system is provided. The method includes providing a fluid path having a cross-sectional dimension of less that about 500 μm, initiating the flow of the fluid through the fluid path in a first direction, and inhibiting the flow of the fluid through the fluid path in a second direction.

According to another embodiment of the present invention, a microfluidic system includes a first fluid path, a second fluid path, and a first closing member comprised of a voltage degradable material and disposed between the first and second fluid paths. In this embodiment, one of the first and second fluid paths has a cross-sectional dimension of less than about 500 μm.

According to another embodiment of the present invention, a microfluidic system includes a first fluid path, a second fluid path, and a first closing member comprised of a voltage degradable material and disposed between the first and second fluid paths. In this embodiment, the first closing member has a thickness of less than about 50 μm.

According to another embodiment of the present invention, a microfluidic device includes a substantially sealed fluid reservoir, a fluid positioned within the fluid reservoir, a fluid path separated from the fluid reservoir by a closing member, a first electrode connected to the fluid reservoir, and a second electrode connected to the fluid path.

According to another embodiment of the present invention, a method of manipulating fluid flow in a fluidic system includes creating a voltage difference between a first fluid path and a second fluid path separated by a closing member, the voltage being sufficient to form an opening in the closing member. The method further includes allowing a fluid to flow between the first and second fluid paths.

According to another embodiment of the present invention, a method of testing includes introducing a test fluid into a test reservoir. The method also includes creating a voltage difference between the test reservoir and a reagent reservoir containing a reagent and separated from the test reservoir by a closing member, the voltage difference being sufficient to make an opening in the closing member. The method further includes allowing at least one of the test fluid and the reagent to flow between the test reservoir and the reagent reservoir.

According to another embodiment of the present invention, a method of making an opening in a fluidic system includes creating a voltage difference between a first fluid path and a second fluid path separated from the first fluid path by a closing member sufficient to make an opening in the closing member.

Other advantages, novel features, and objects of the invention will become apparent from the following detailed description of the invention when considered in conjunction with the accompanying drawings, some of which are schematic and which are not intended to be drawn to scale. In the figures, each identical or nearly identical component that is illustrated in various figures is represented by a single numeral. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

FIG. 7 is a photocopy of a photomicrograph of a lymph valve;

FIG. 8 is a photocopy of a photomicrograph of one embodiment of a microfluidic system according to the present invention, configured as a valve and including a flow indicator;

FIG. 9 is a photocopy of a photomicrograph of the microfluidic system of FIG. 8, including a flow indicator;

FIG. 35 is a top, plan view of one embodiment of a microfluidic system according to the present invention;

DETAILED DESCRIPTION

Figure 1:
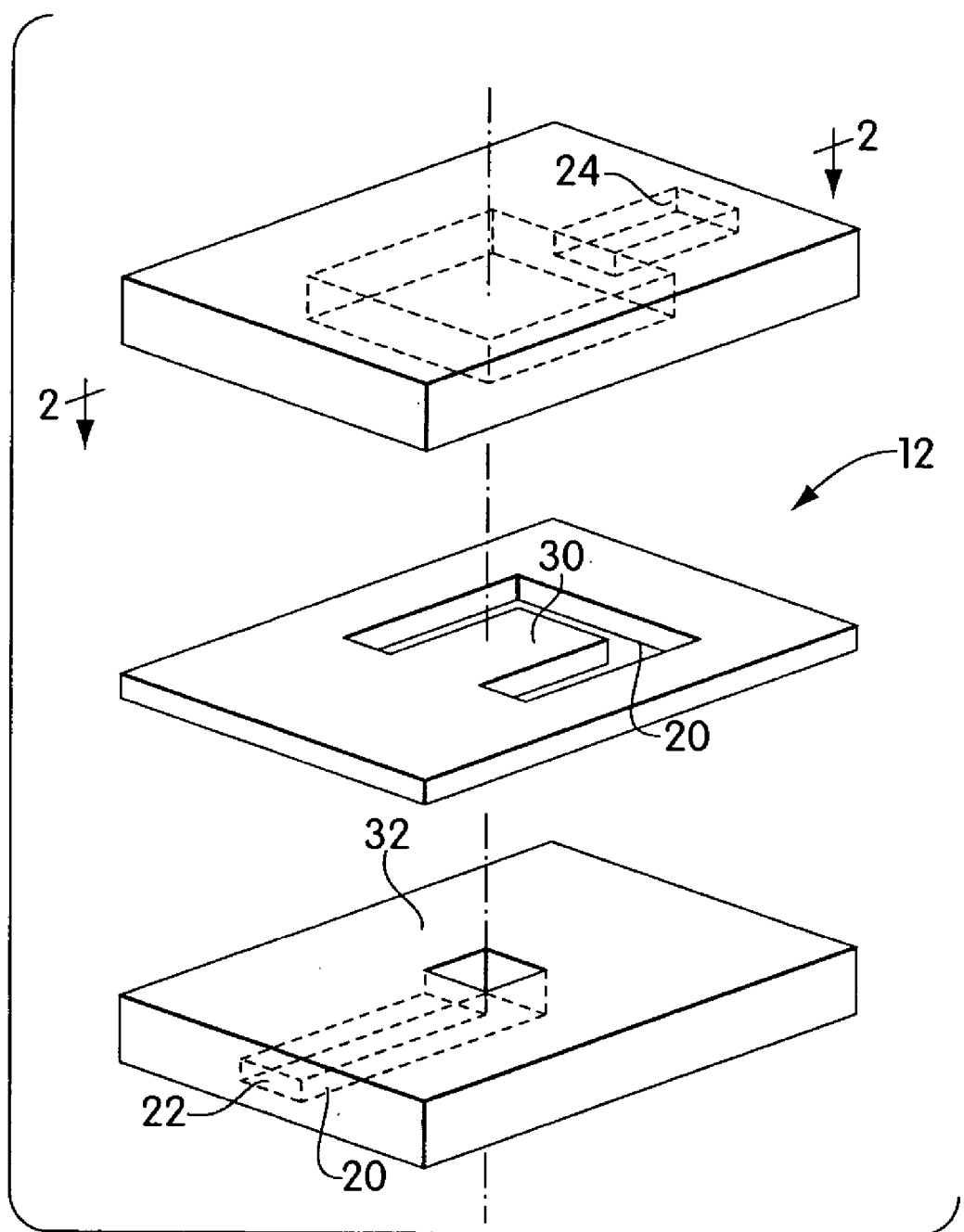
FIG. 1 is an exploded, perspective view of one embodiment of a microfluidic system according to the present invention, configured as a valve.

The present invention is directed to a microfluidic system. "Microfluidic system," as used herein, refers to a device, apparatus or system including at least one fluid path having a cross-sectional dimension of less than 1 millimeter (mm). "Fluid path," as used herein, refers to any channel, tube, pipe or pathway through which a fluid, such as a liquid or a gas, may pass. "Cross-sectional dimension," as used herein, refers to the shortest distance that may be measured between any two opposed sides of a fluid path. However, in certain preferred embodiments, the longest distance that may be measured between any two opposed sides of a fluid path is also less than the maximum cross-section for that embodiment.

In one embodiment, the microfluidic system includes a fluid path, an inlet to the fluid path, an outlet to the fluid path and a first closing member disposed along the fluid path between the inlet and the outlet. As used herein, "closing member" refers to any structure specifically adapted to selectively inhibit or prevent the flow of fluid through a fluid path or between fluid paths, reservoirs, and the like. Such a closing member has an open position and a closed position and may move between these positions (either from open to closed or closed to open) at least once. This definition specifically excludes structures, such a relatively thin wall between fluid paths, that are not intended to have open and closed positions, but that may be opened or closed under some circumstances, such as the application of a relatively high pressure. The microfluidic system according to this embodiment may be constructed to function as a valve.

Referring now to the figures, and, in particular, to FIGS. 1-3, an embodiment of a microfluidic system that may be constructed to be suitable for use as a valve 12 will be described. This embodiment of a microfluidic system 10 may include a fluid path 20, an inlet 22 to fluid path 20, an outlet 24 to fluid path 20 and a closing member 30 disposed along fluid path 20 between inlet 22 and outlet 24. Typically, in operation of valve 12, a fluid is introduced, for example by pumping, into fluid path 20 through inlet 22. Following introduction, the fluid flows through fluid path 20 in a first direction toward outlet 24, passing closing member 30. However, if fluid flow changes direction, for example due to a cessation of pumping, fluid is inhibited from flowing through fluid path 20 from outlet 24 to inlet 22 due to the action of closing member 30, which at least partially blocks its path. The action of closing member 30 may be better understood with reference to the construction of valve 12.

Fluid path 20 may be constructed in any manner and of any materials that allow a fluid to flow through fluid path 20 without adversely affecting or being affected by the fluid. For example, fluid path 20 may have any configuration or cross-sectional dimension that allows passage of a fluid or fluids to be used with microfluidic system 19 at an acceptable pressure drop. Preferably, the cross-sectional dimension is as small as possible without inhibiting the flow of the fluid or fluids to be used with microfluidic system 10. For example, fluid path 20 may have a cross-sectional dimension of less than 1 mm, preferably less than 500 μm, more preferably less than 300 μm, still more preferably less than 100 μm and, most preferably, less that 50 μm. However, it should be recognized that the preferred cross-section dimension of fluid path 20 will vary with the fluid or fluids. For example, fluids, such as blood, including cells therein may suffer damage to the cells if the cross-sectional dimension is too small. As a further example, fluids having a relatively high viscosity may require excessive pumping pressure if the cross-sectional dimension is small.

The preferred configuration of fluid path 20 may vary with microfluidic system 10 and fluid or fluids to be used therein. Generally, fluid path 20 is preferred to be as straight and direct as possible to minimize pressure drop and reduce damage to time sensitive or shear sensitive liquids. However, in some instances, fluid path 20 may be preferred to be longer or more convoluted than necessary, such as where fluid path 20 serves as a reactor or mixer wherein a residence time is desired. Fluid path 20 may have any cross-section suitable for use with the desired fluid or fluids. For example, the cross-section of fluid path 10 may be polygonal, ovoid or of odd or irregular shape.

Fluid path 20 includes inlet 22 and outlet 24. Inlet 22 may be constructed in any manner that allows fluid to be introduced into fluid path 20. For example, inlet 22 may be a port, slit, funnel or other opening. Inlet 22 may be adapted to mate with an additional fluid path 20, pump or other device to facilitate the introduction of fluid into fluid path 20. Similarly, outlet 24 may be constructed in any manner that allows fluid to exit fluid path 20. For example, outlet 24 may be a port, slit or other opening. Outlet 24 may also be adapted to mate with an additional fluid path 20, pump or other device to facilitate passage of fluid from microfluidic system 10 into the additional fluid path 20, pump or other device.

Fluid path 20 may be constructed of any material or materials that will not adversely affect or be affected by fluid flowing through fluid path 20. For example, fluid path 20 may be constructed of a material that is chemically inert in the presence of fluids to be used within fluid path 20. Preferably, fluid path 20 is constructed of a single material that is cheap, durable and easy to work with, facilitating field use and cost effective disposability. For example, fluid path 20 may be constructed of a polymeric material. Where fluid path 20 is constructed of a polymer, the polymer may be selected based, for example, on its compatibility with the fluids to be used, its durability and shelf life, its cost and its ease of use. Preferably, fluid path 20 is constructed from poly(dimethlsiloxane) ("PDMS"). PDMS is a relatively inexpensive, durable, elastomeric polymer. Because PDMS is stable, fluid path 20 and other portions of microfluidic systems constructed of PDMS may have a shelf life of 6 months or more. PDMS is also relatively easy to work with. It should be understood that while polymeric materials, and particularly PDMS, are preferred for the construction of fluid path 20, other materials, including conventional silicon chip materials, may be used to construct some or all portions of fluid path 20. Other suitable materials include polymers described as suitable for use in fabricating a stamp in U.S. Pat. No. 5,512,131, which is hereby incorporated herein by reference in its entirety.

Closing member 30 may be constructed in any manner and of any material or materials that allow it to selectively permit or inhibit fluid flow. One typical criteria for selecting whether to permit or inhibit fluid flow is fluid flow direction. For example, closing member 30 may permit fluid flow in a first direction and inhibit fluid flow in a second direction as described previously. This type of closing member 30 is referred to as a check valve. Where closing member 30 functions as a check valve, closing member 30 may be constructed in any manner such that it is opened by fluid flow in a first direction, and/or closed by fluid flow in a second direction. For example, closing member 30 may be constructed such that it is pushed open by fluid flow in a first direction or pushed closed by fluid flow in a second direction.

Figure 17:
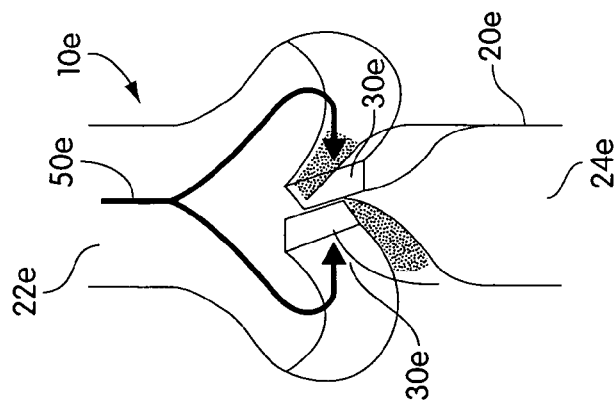
FIG. 17 is a perspective, plan view of the microfluidic system illustrated in FIG. 16, including flow indicators.
Figure 16:
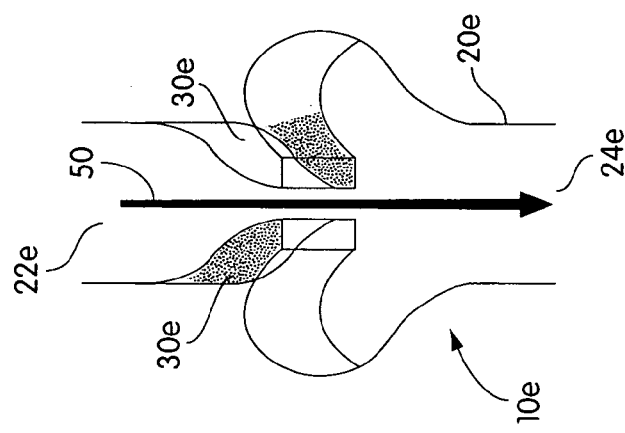
FIG. 16 is a perspective, plan view of one embodiment of a microfluidic system according to the present invention, including a flow indicator.
Figure 19:
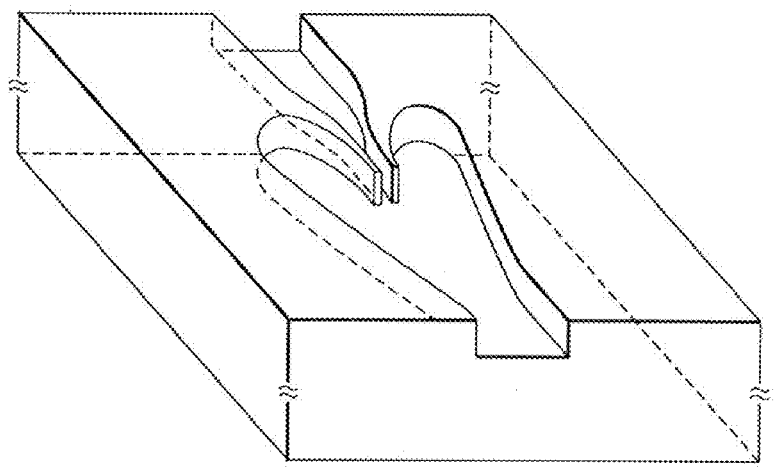
FIG. 19 is a perspective view of one embodiment of a microfluidic system according to the present invention.

Preferably, closing member 30 opens and closes without sliding against any portion of the microfluidic system as this may cause failure of closing member 30 due to mechanical damage or being caught in an open or closed position. Where closing member 30 is constructed such that it slides against any portion of the microfluidic system, some manner of reducing the friction between closing member 30 and the portion of the microfluidic system may be employed. For example, as illustrated in FIGS. 16, 17 and 19, the surfaces in contact with one another may be non-stick surfaces or may be treated with a suitable lubricant, such as petroleum jelly (illustrated by the shaded regions of closing member 30).

In some embodiments, such as those illustrated in FIGS. 1-9, closing member 30 is a flexible member. Where closing member 30 is a flexible member, closing member 30 may be constructed in any manner that allows closing member 30 to be opened and closed as desired.

Figure 2:
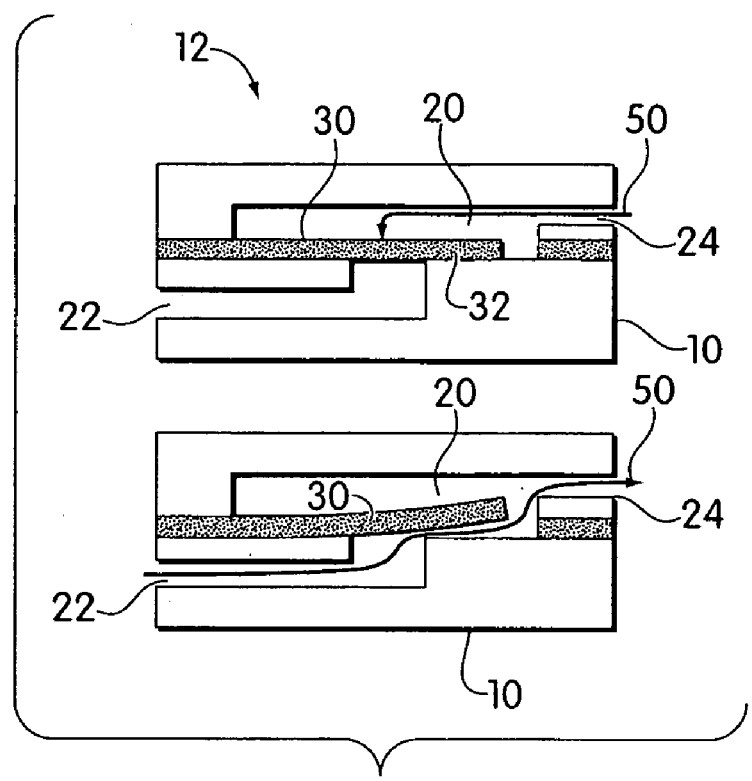
FIG. 2 is a cross sectional view through section line 2-2 of the microfluidic system of FIG. 1, including a flow indicator.
Figure 3:
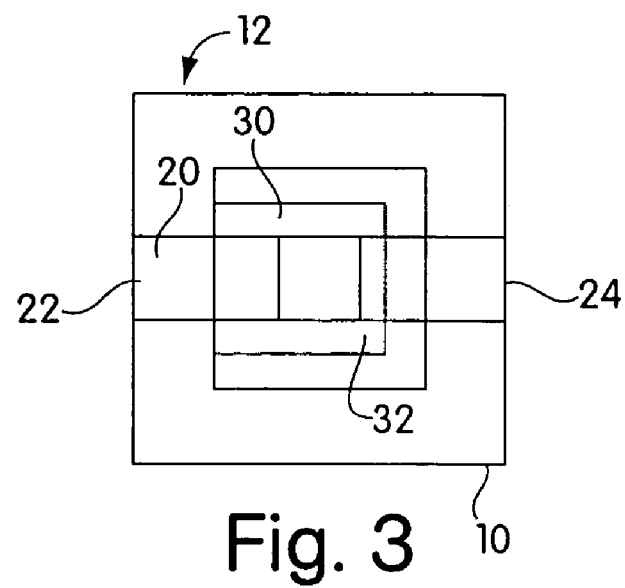
FIG. 3 is a transparent, plan view of the microfluidic system of FIG. 1.

As illustrated in FIGS. 1-3, in some embodiments, closing member 30 may be a flap. By flap it is meant a generally planar structure attached to a base, such that the structure may move relative to the base. Where closing member 30 is a flap it may be constructed in any manner that allows it to permit fluid to flow past closing member 30 in a first direction, but inhibits fluid flow in a second direction. For example, closing member 30 may be constructed such that it covers fluid path 20 when closed. Where closing member 30 covers fluid path 20, fluid path 20 may be constructed such that closing member 30 is allowed to move in a first direction so that it does not cover fluid path 20 and is inhibited from moving in a second direction by the shape of fluid path 20. For example, as illustrated in FIGS. 1-3, closing member 30 may cover a relatively narrow portion of fluid path 20, such as a seat 32, and reside in a relatively large portion of fluid path 20. Accordingly, as illustrated by flow indicator 50 in the lower portion of FIG. 2, fluid moving through fluid path 20 in a first direction may push closing member 30 into the relatively large portion and into an open position. Conversely, as illustrated by flow indicator 50 in the upper portion of FIG. 2, fluid moving through fluid path 20 in a second direction may not push closing member 30 past seat 32 and, thus, cannot open it, rather, fluid pressure in the second direction acts to seal closing member 30 in a closed position, reducing the possibility of leakage.

Figure 20:
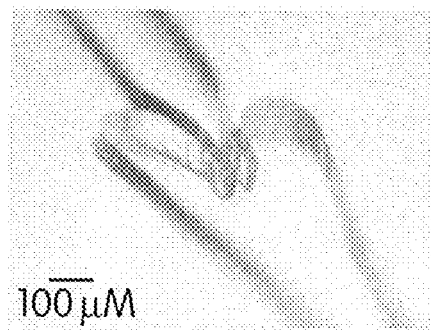
FIG. 20 is a photocopy of a photomicrograph of a microfluidic system according to the present invention.

Instead of being a single flap, closing member 30 may consist of two or more flaps. In some embodiments, such flaps, rather than closing against seat 32 of fluid path 20, may close against one another. Such a closing member 30a is illustrated in FIGS. 8, 9, 19 and 20. In FIG. 20 fluid path 20a and valve 12a are open on their upper side for purposes of illustration. In the embodiment of FIGS. 8, 9, 19 and 20, valve 12a is modeled after a lymphatic valve, such as that illustrated in FIG. 7. When fluid flows in a first direction, as indicated by flow indicator 50a in FIG. 8, the flaps of closing member 30a are pushed apart, opening closing member 30a. Conversely, when fluid flows in a second direction, as indicated by flow indicator 50a in FIG. 9, the flaps of closing member 30a are pushed against one another, closing and sealing closing member 30.

In a valve having two closing members 30a that close against one another, such as that illustrated in FIGS. 8, 9, 19 and 20, closing members 30a may be attached to fluid path 20a in any manner allowing them to permit flow of fluid in a first direction and to inhibit flow of fluid in a second direction. For example, closing members 30a may be connected to the sides, top and/or bottom of fluid path 20a. Preferably, closing members 30a have sufficient freedom of movement to effectively come together to inhibit back flow, but not so much freedom that they are easily bent over, twisted, or pushed aside by fluid flow. In one embodiment, closing members 30a are connected to fluid path 20 only at the sides of fluid path 20a. Where specific versions of this embodiment allow closing members 30 to twist or fall over with flow, another point of connection may be used, such as the top or bottom of fluid path 20a.

Where closing member 30 is a flap, it may be constructed in a variety of shapes. For example, closing member 30 may be rectangular, as illustrated in FIGS. 1-3, or may be constructed as another polygon, such as a hexagon, a circle or a portion of a circle, such as a semicircle, or with an odd or irregular shape. Preferably, closing member 30 is roughly semicircular.

The manner and material of construction of closing member 30 may be used to tailor the ease with which it is opened. For example, stiffer closing members 30, such as those that are thicker or constructed of stiffer materials, will require more fluid pressure to open and may provide a better seal when closed, while more flexible closing members, such as those that are thinner or constructed of more flexible materials, may require less fluid pressure to open. It should also be appreciated that the degree of seal may also be dependant on the ability of closing member 30 to conform to fluid path 20 when in a closed position and, accordingly, if closing member 30 is too stiff to conform to fluid path 20, it may inhibit the seal rather than improving it.

Figure 4:
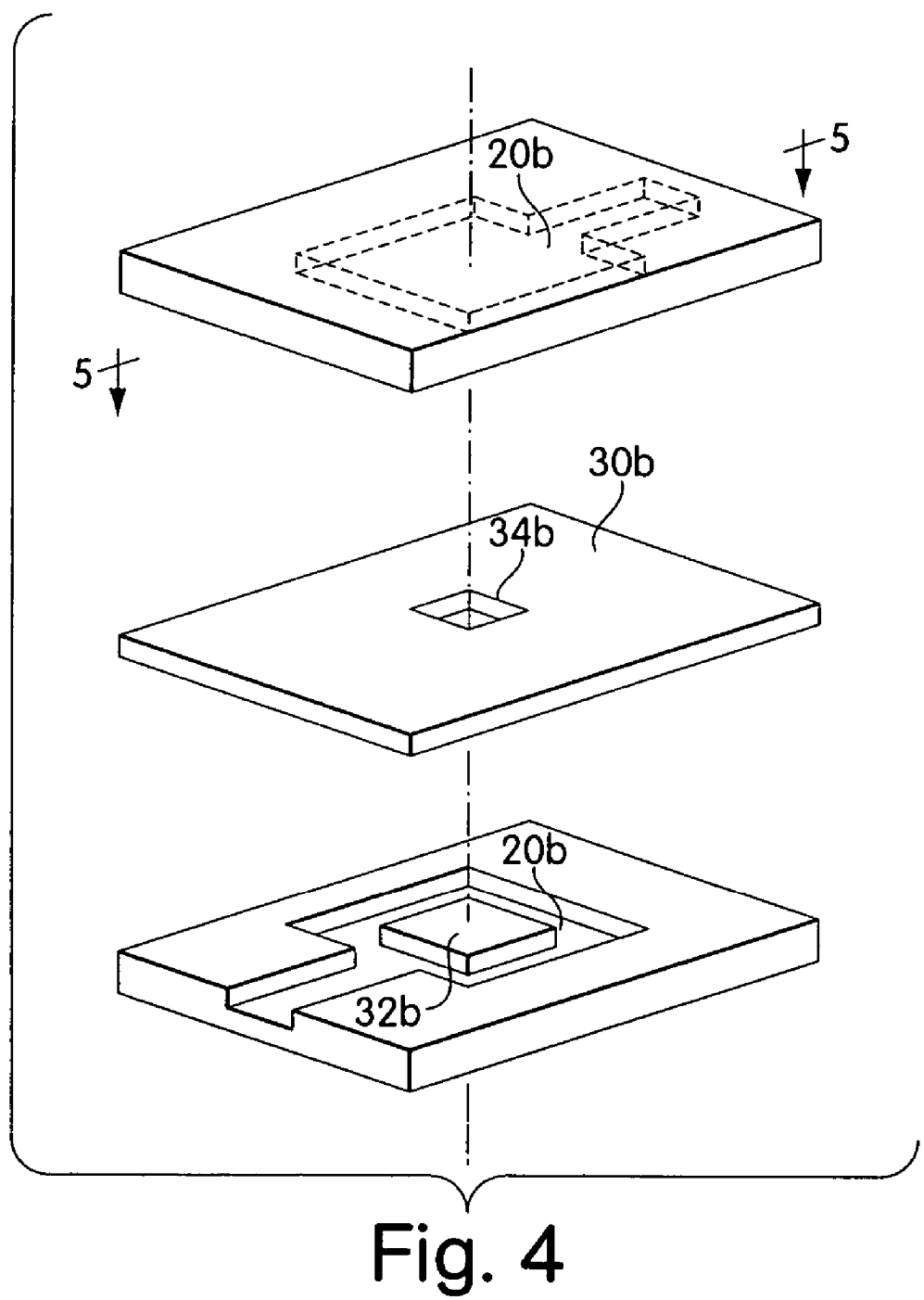
FIG. 4 is an exploded, perspective view of one embodiment of a microfluidic system according to the present invention, configured as a valve.
Figure 5:
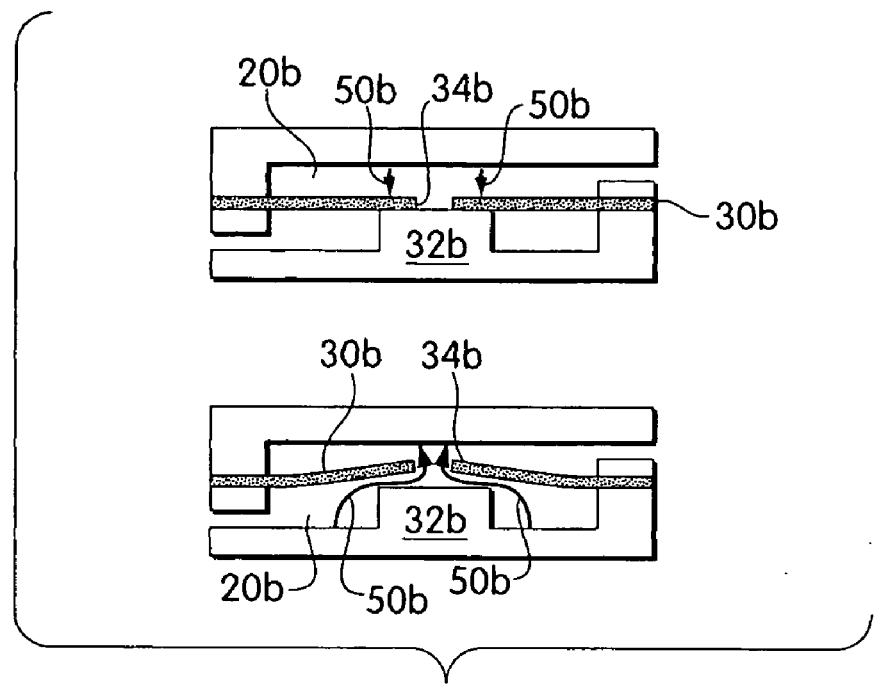
FIG. 5 is a cross sectional view through section line 5-5 of the microfluidic system of FIG. 4, including flow indicators.
Figure 6:
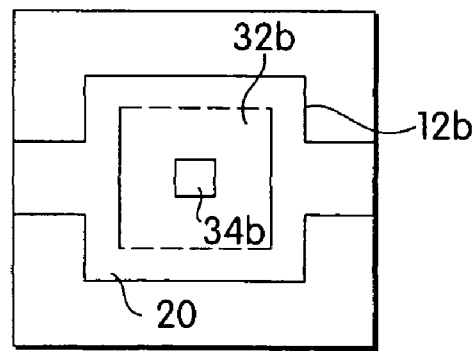
FIG. 6 is a transparent, plan view of the microfluidic system of FIG. 4.

As illustrated in FIGS. 4-6, in some embodiments, closing member 30b may be a diaphragm. By diaphragm it is meant a generally planar structure attached at its edges to a base and having an opening therein. Where closing member 30b is a diaphragm it may be constructed in any manner that permits fluid to flow past closing member 30b in a first direction, but not in a second. For example, closing member 30b may be constructed such that it covers fluid path 20b but is allowed to move in a first direction, exposing an opening 34b in closing member 30b, through which fluid may flow. In this embodiment, closing member 30b is inhibited from moving in a second direction to expose opening 34b by the shape of fluid path 20. For example, as illustrated in FIGS. 4-6, closing member 30b may cover fluid path 20b and be supported by a seat 32b that covers opening 34b. Accordingly, as illustrated by flow indicators 50b in the lower portion of FIG. 5, fluid moving through fluid path 20b in a first direction pushes closing member 30b away from seat 32b and into an open position. Conversely, as illustrated by flow indicators 50b in the upper portion of FIG. 2, fluid moving through fluid path 20b in a second direction cannot push closing member 30b past seat 32b and, thus, cannot open it. In fact, fluid pressure in the second direction acts to seal closing member 30b in a closed position, pushing it against seat 32b and reducing the possibility of leakage.

Where closing member 30b is a diaphragm including opening 34, opening 34b may be constructed in any manner that allows the passage of fluid through opening 34b. For example, opening 34b may be constructed in a variety of shapes. For example, opening 34b may be square or rectangular, as illustrated in FIGS. 4-6, or may be constructed as another polygon, such as a hexagon, a circle or a portion of a circle, such as a semicircle, or with an odd or irregular shape. Seat 32b may be constructed in any manner that supports closing member 30b around at least the periphery of opening 34b. For example, seat 32b may also be constructed in a variety of shapes. Preferably, the shape of seat 32b corresponds to the shape of opening 34b to ensure adequate support of closing member 30b. As is the case where closing member 30 is a flap, the manner and material of construction of closing member 30b where closing member 30b is a diaphragm may be used to tailor the ease with which closing member 30 is opened.

Figure 10:
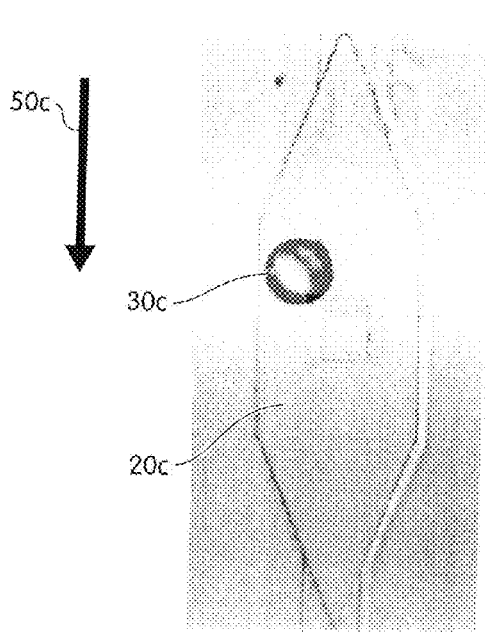
FIG. 10 is a photocopy of a photomicrograph of one embodiment of a microfluidic system according to the present invention, configured as a valve, including a flow indicator.
Figure 11:
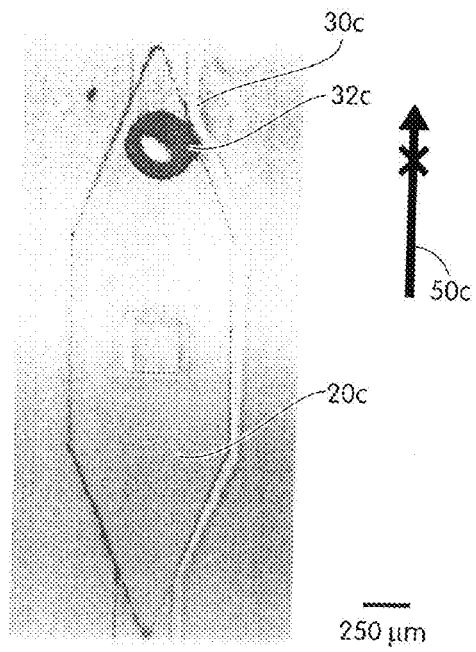
FIG. 11 is a photocopy of a photomicrograph of the microfluidic system of FIG. 10, including a flow indicator.

Closing member 30c may also be a free-floating member. Where closing member 30c is a free-floating member it may be constructed in any manner and of any material or materials that allow closing member 30c to selectively permit or inhibit fluid flow past closing member 30c. For example, as illustrated in FIGS. 10 and 11, closing member 30c may be constructed such that it permits the flow of fluid in a first direction and inhibits the flow of fluid in a second direction. In the embodiment illustrated in FIGS. 10 and 11, closing member 30c is carried into and out of a narrow portion of fluid path 20c, such as seat 32c. When fluid is flowing in a first direction, as illustrated by flow indicator 50c in FIG. 10, closing member 30c is carried into an open area, such that fluid can pass closing member 30c. When fluid flows in a second direction, as illustrated by flow indicator 50c in FIG. 11, closing member 30c is carried by the fluid into seat 32c of fluid path 20c, obstructing fluid flow.

Where closing member 30c is a free-floating member, it may constructed to fit snugly within seat 32c of fluid path 20c, inhibiting leakage when fluid flow is in the second direction. Preferably, closing member 30c is a spherical body and seat 32c of fluid path 20 is circular in cross-section; while other shapes and arrangements are possible, this arrangement ensures a snug fit between closing member 30c and fluid path 20c, irrespective of the orientation of closing member 30c.

Closing member may be constructed of any material or materials that allow it to selectively permit or inhibit fluid flow. Closing member may also be made of a material that will not adversely affect or be affected by a fluid or fluids in microfluidic system 10, such as a material that is inert with respect to the fluid or fluids for use in microfluidic system 10. The preferred material for closing member varies according to the nature of closing member. For example, where closing member is a flexible member, such as flap or diaphragm, it is preferably constructed of a polymeric material, such as PDMS, as described previously with respect to fluid path 20. Where closing member 30c is a free-floating member, closing member 30c is preferably constructed of a material that is easily moved by fluid flow and which may form a good seal with the material of fluid path 20c. For example, closing member 30c may be constructed of glass or other silicon-based material, a polymeric material, such as PDMS, or another relatively durable, lightweight material.

Figure 23:
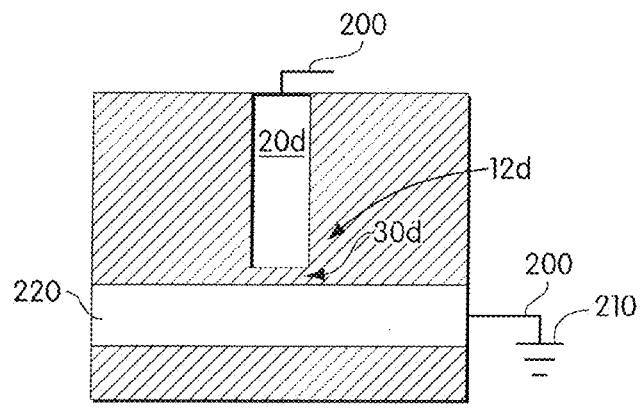
FIG. 23 is plan view of one embodiment of a microfluidic system according to the present invention, configured as a one-use valve.

In another embodiment of the present invention, valve 12d may be constructed as a one-use valve. By "one-use valve" it is meant a valve that, once opened, cannot be closed in the manner in which it was opened. For example, in one embodiment of the invention, valve 12d may be a one-use valve opened by damage to closing member 30d, such as a voltage difference across closing member 30d that results in breakdown and consequent formation of an opening in closing member 30d. In other embodiments, modifying the temperature of closing member 30, or portions thereof, may be used to open a one-use valve. Referring now to FIG. 23, one embodiment of valve 12d configured as a one-use valve is illustrated. In the illustrated embodiment, a microfluidic system includes a first fluid path 20d, a second fluid path 220 and a first closing member 30d disposed between the first and second fluid paths 20d, 220.

First and second fluid paths 20d, 220 may be arranged in any manner that allows closing member 30d to be formed between them. For example, first and second fluid paths 20d, 220 may be arranged in a "T" shape, as illustrated in FIG. 23. As an alternate example, fluid paths 20d, 220 may be arranged end to end, effectively forming a single fluid path broken by closing member 30d. In some embodiments, such as that illustrated in FIG. 26, multiple fluid paths may be separated from one another by multiple closing members 30d. In the specific embodiment of FIG. 26, ten fluid paths 20d are separated from a single, central fluid path 220 by ten closing members 30d. The embodiment illustrated in FIG. 23 may be part of a larger microfluidic system such as region 225 in FIG. 26. An arrangement such as that illustrated in FIG. 26 may be useful for adding materials in a particular order, as required in some analytical techniques.

Where valve 12d is constructed as a one-use valve, closing member 30d may be constructed to be in a closed position such that fluid flow past or through closing member 30d is inhibited or eliminated. For example, closing member 30d may include a substantially sealed barrier. Where closing member 30d is constructed to inhibit or eliminate fluid flow, the dimensions of closing member may vary with the application and the material from which closing member 30 is constructed. For example, closing member 30d may be thick enough to remain closed until it is desired to open it, but not so thick that it can not be opened conveniently, for example, that excessive voltage is required to do so. For example, for some materials, closing members 30d between about 1 and about 100 micrometers thick may be appropriate, for others, closing members 30d between about 5 and about 50 micrometers thick may be appropriate, for others, closing members 30d between about 15 and about 40 micrometers thick may be appropriate, and for still others, closing members 30 about 20 micrometers thick may be desired.

While embodiments of closing member 30d for use with a one-use valve are illustrated herein as being generally planar and of uniform thickness, this disposition is not required, so long as closing member 30d may be opened as desired in a convenient way, e.g. using an acceptable voltage. For example, closing member 30d may be shaped as a hemisphere, other regular shape, or an odd or irregular shape. In some embodiments, closing member 30d may be shaped such that it opens in a desired manner or produces an opening having a desired shape. For example, some portions of closing member 30d may be thinner than other portions of closing member 30d, making formation of an opening more likely in those portions.

Where closing member 30d is constructed to inhibit or eliminate fluid flow, it may be constructed of any material or materials described previously for formation of closing members as well as any other material or materials that are compatible with the fluids to be used, substantially fluid tight, and capable of being opened by an acceptable voltage. For example, closing member 30d may be constructed of a material having a breakdown voltage of less than about 250 volts per micrometer, a breakdown voltage of less than about 150 volts per micrometer, a breakdown voltage of less than about 75 volts per micrometer, or a breakdown voltage of less than about 25 volts per micrometer. Materials with these characteristics can be readily selected by those of ordinary skill in the art. For example, any polymer that is not soluble in the liquid(s) to be used in the microfluidic system may find utility in particular embodiments. In a preferred embodiment, closing member 30d is constructed from a material previously disclosed for use in the formation of as fluid paths 20d, 220. In another preferred embodiment, closing member 30d and fluid paths 20d, 220 are formed in a single piece of material, such as PDMS (PDMS has a breakdown voltage of 21 volts per micrometer). A material capable of being broken down by application of an acceptable voltage is referred to herein as a "voltage degradable material." As described herein, an acceptable voltage may vary with the fluids to be used and other parameters of the specific microfluidic system. For example, where bubble formation may be undesired, an acceptable voltage would inhibit bubble formation.

Figure 24:
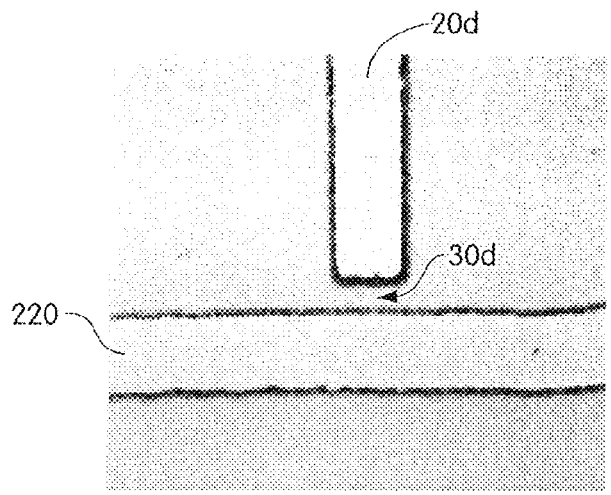
FIG. 24 is a photocopy of a photomicrograph of one embodiment of a microfluidic system according to the present invention, configured as a one-use valve.
Figure 25:
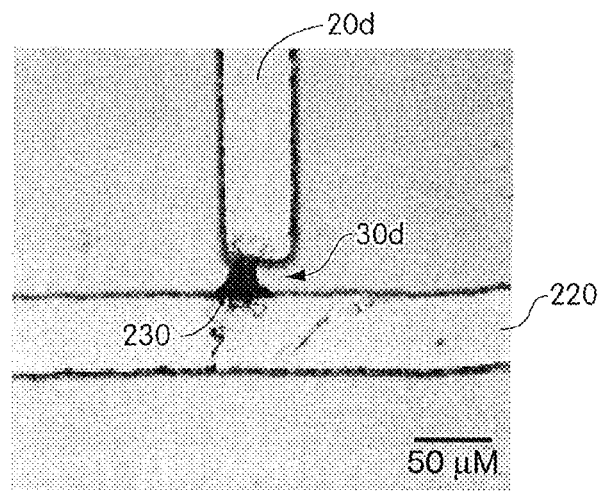
FIG. 25 is a photocopy of a photomicrograph of the microfluidic system of FIG. 24 in an open position.

Referring now to FIGS. 23-25, a one way valve may be opened by providing a voltage to closing member 30d such that an opening 230 is formed therein. For example, a voltage greater than the breakdown voltage of closing member 30d may be provided such that opening 230 is formed in closing member 30d. Voltage applied to closing member 30d may be of either negative or positive polarity. Voltage may be applied in any manner so long as the voltage is directed to closing member 30d. For example, an electrical source may be used to provide the desired voltage. The electrical source may be any source of electricity capable of generating the desired voltage. For example, the electrical source may be a pizoelectrical source, a battery, or a device powered by household current. In one embodiment, a pizoelectrical discharge from a gas igniter was found to be sufficient to produce the desired voltage.

Voltage may be supplied to closing member 30d through the use of electrodes 200. For example, electrodes 200 may be used to connect closing member 30d directly or indirectly to an electrical source and/or to a ground 210. In one embodiment, electrodes 200 may be placed directly in contact with closing member 30d. In another embodiment, electrodes 200 may be placed in contact with fluid in fluid paths 20d, 220, so long as the fluid is sufficiently conductive to provide voltage to closing member 30d. Where indirect supply of voltage to closing member 30d is desired, the use of liquid fluids having sufficient ionic strength to be conductive is generally preferred, though any conductive fluid may be used. Fluids having an ionic strength of 10 mM (millimolar) and 166 mM were found to be suitable for transmitting the voltage, with the higher ionic strength fluid generating a larger opening.

Electrodes 200 may be constructed in any manner that allows electricity to be transmitted directly or indirectly to closing member 30d. For example, electrodes 200 may include any conductive material compatible with the fluids and materials to be used in the microfluidic system. Higher conductivity materials that transmit voltage quickly to closing member 30d, resulting in shorter voltage ramp times, and larger openings, as will be described below, are generally preferred. Examples of materials that may be form suitable electrodes 200 include conductive metals such as steel, platinum, silver, gold and copper as well as other conductive materials, such a conductive polymeric materials.

Figure 26:
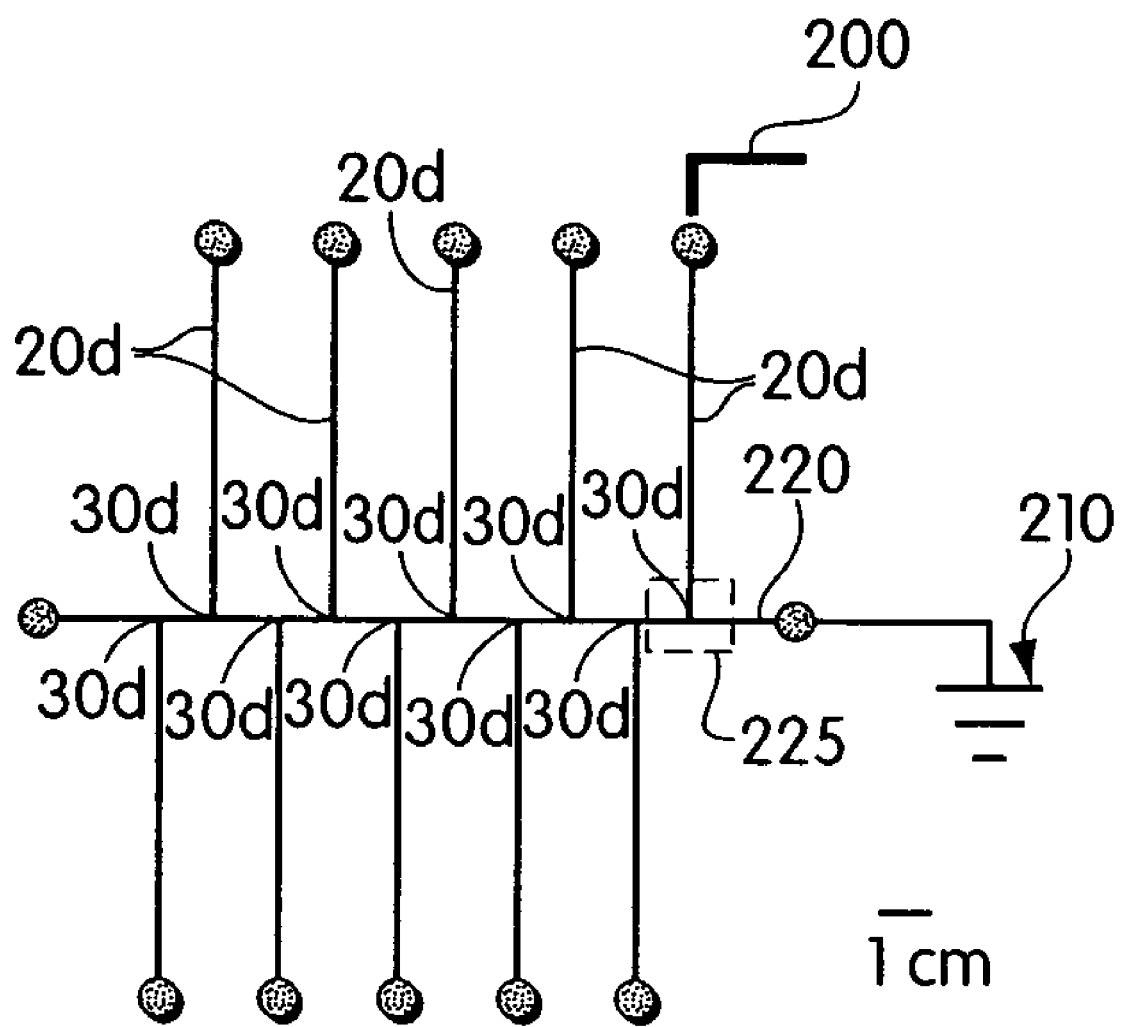
FIG. 26 is a plan view of an embodiment a microfluidic system of the present invention, incorporating a plurality of one-use valves.

In microfluidic systems having more than one closing member that may be opened, the fluid path on the opposite side of the closing member to be opened, and to which voltage is to be applied, may be grounded. For example, in microfluidic systems including multiple closing members connected to a single fluid path 220, such as illustrated in FIG. 26, where voltage is to be applied to first fluid path 20d, second fluid path 220 may be grounded to inhibit opening of more than one closing member 30d where this opening of more than one closing member is not desired. In a similarly configured embodiment where voltage is applied to second fluid path 220 rather than first fluid path 20d, first fluid path 20d may be grounded to promote opening of first fluid path 20d and not other fluid paths connected by closing members to second fluid path 220.

The voltage to open a particular closing member may vary depending on the construction of the closing member and its surroundings. For example, the thickness of the closing member and its breakdown voltage may affect the opening voltage. The ionic strength of fluid in fluid paths 20d, 220 may also affect the opening voltage. The theoretical minimum opening voltage required if delivered directly to the closing member is the product of the break down voltage of the material(s) forming the closing member and the thickness of the closing member. For, example, for PDMS closing members 20 micrometers thick and having a breakdown voltage of 21 volts per micrometer, the theoretical minimum pulse of voltage is 20 micrometers times 21 volts per micrometer or 420 V.

Actual voltages may be applied to closing member 30d that are greater than the theoretical minimum opening voltage. Applying voltages greater than the theoretical minimum may decrease the length of the voltage pulse required to create opening 230. For example, for 20 micrometer thick PDMS closing members, openings 230 were complete in less than 1 second for voltages above 1 kV, while a voltage of 2 kV created opening 230 in 50 milliseconds and a voltage of 5 kV created opening 230 in 20 milliseconds. The actual voltage at breakdown of closing member 30d may be less than the applied voltage because breakdown and the creation of opening 230 may occur during the ramping period. For example, the above-described 2 kV and 5 kV pulses actually resulted in breakdown at 1.8 kV and 3.4 kV, respectively, because the breakdown occurred during the ramping period.

Figure 27:
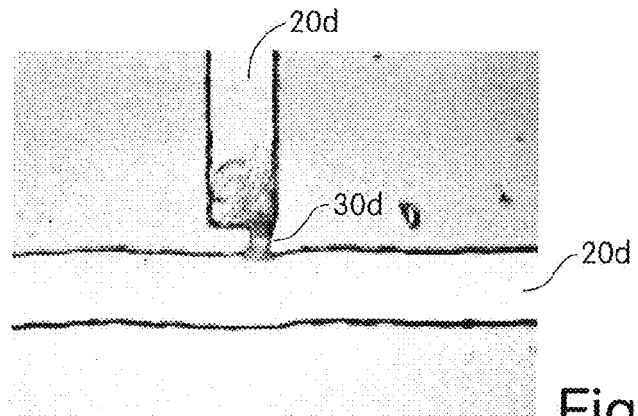
FIG. 27 is a photocopy of a photomicrograph of one embodiment of a microfluidic system of the present invention configured as a one-use valve in an open position.
Figure 28:
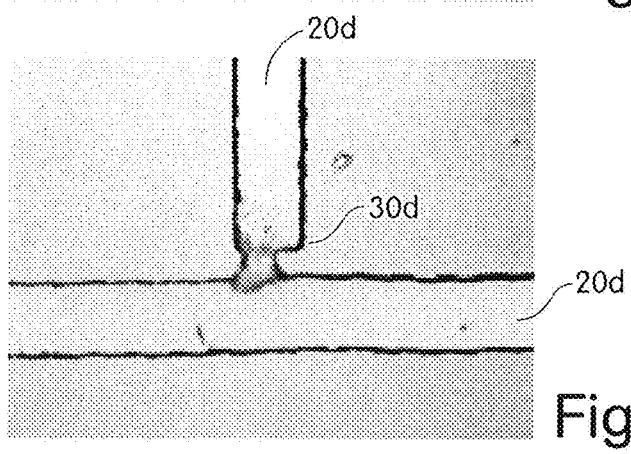
FIG. 28 is a photocopy of a photomicrograph of one embodiment of a microfluidic system of the present invention configured as a one-use valve in an open position.
Figure 29:
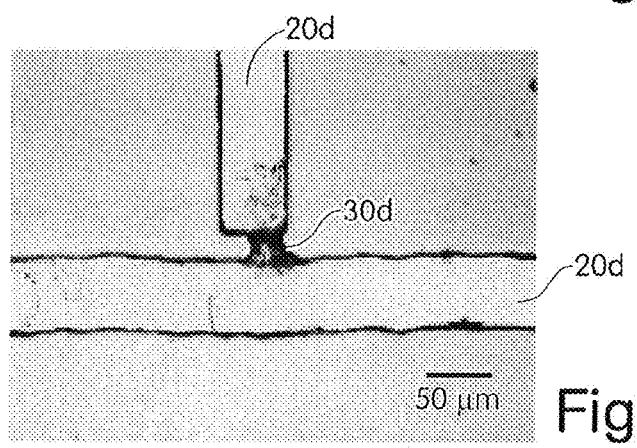
FIG. 29 is a photocopy of a photomicrograph of one embodiment of a microfluidic system of the present invention configured as a one-use valve in an open position.
Figure 30:
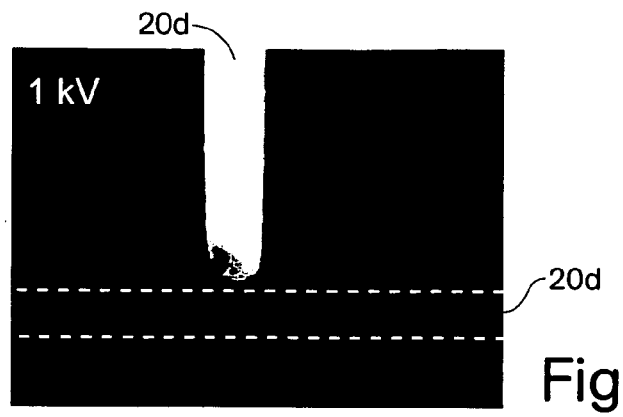
FIG. 30 is a photocopy of a photomicrograph of one embodiment of a microfluidic system of the present invention configured as a one-use valve in an open position.
Figure 31:
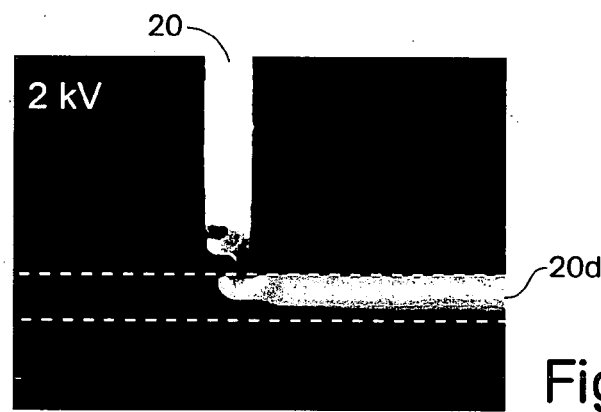
FIG. 31 is a photocopy of a photomicrograph of one embodiment of a microfluidic system of the present invention configured as a one-use valve in an open position.
Figure 32:
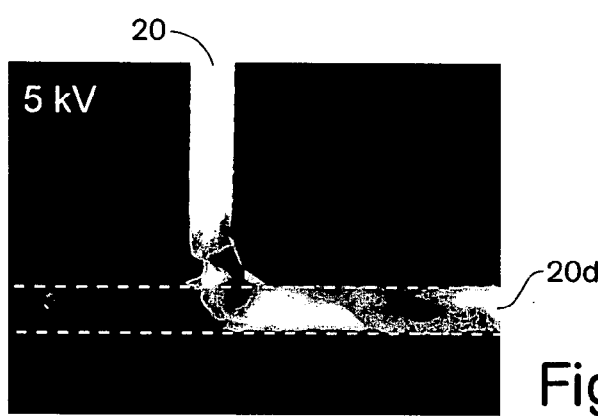
FIG. 32 is a photocopy of a photomicrograph of one embodiment of a microfluidic system of the present invention configured as a one-use valve in an open position.
Figure 33:
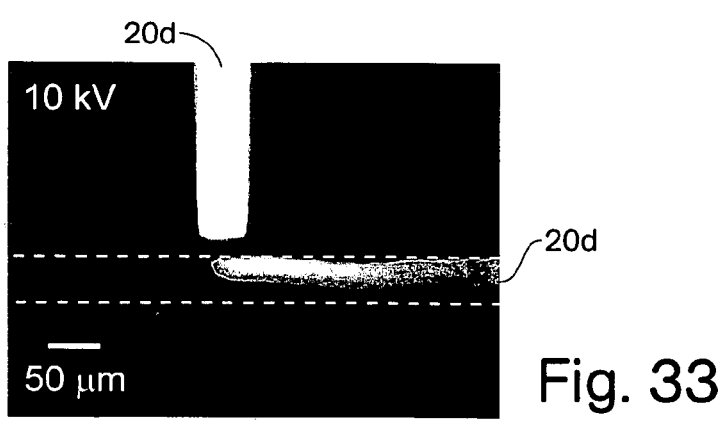
FIG. 33 is a photocopy of a photomicrograph of one embodiment of a microfluidic system of the present invention configured as a one-use valve in an open position.

The length of a voltage pulse may be any amount of time that produces the desired opening 230 in closing member 30d. For some materials and conditions, the size of opening 230 may be independent of the length of the voltage pulse, so long as a minimum pulse length is used. For example, 50 millisecond, 60 millisecond and 1 second pulses of 2 kV across a PDMS closing member were found to produce openings 230 of approximately the same size, as illustrated in FIGS. 27-29.

Opening 230 may take any form that allows the desired amount of fluid to pass between fluid paths 20d, 220. For example, opening 230 may be sized to allow the desired amount of fluid to pass between fluid paths 20d, 220. For example, where a lower flow rate is preferred, opening 230 may be relatively small, while, where a higher flow rate is preferred, opening 230 may be larger. Depending on the embodiment, holes from about 2 micrometers in average diameter to about 50 micrometers in average diameter may be useful, and even smaller, or larger, openings 230 may be desired in particular embodiments. The size of opening 230 may be limited only by the size of closing member 30d, and may even exceed the size of closing member 30 in some embodiments.

The voltage, voltage ramp rate and ionic strength of fluid within fluid paths 20d, 220 may affect the size of opening 230. Specifically, higher voltages, faster ramp rates and higher ionic strength fluids typically result in larger openings. For example, constant voltage ramp rates, such as 500 V/50 ms, resulted in smaller openings than those when the ramp rate increased exponentially with time. In one particular embodiment where the voltage increased exponentially with time, the voltage as a function of time was roughly:

$$V(t)=5000*(1-\exp(-t/\tau))$$

where t is time, V is voltage and r is resistance times capacitance (RC), which was 16 ms. Similarly, rate of distribution of charge from the electrode to the closing member is dependant on the resistivity of any fluid therebetween; increasing the ionic strength (decreasing the resistivity) of the fluid thus effectively shortens the ramp rate of the electrical source, resulting in a larger opening. Accordingly, a desired size of opening 230 may be provided by adjustment of these values.

Opening 230 may be any shape that allows the desired amount of fluid to pass between fluid paths 20, 220 and need not be a single hole. For example, opening 230 may be of odd or irregular shape or may be of a particular shape dictated by the shape of closing member 30d. As another example, opening 230 may consist of a plurality of smaller holes in closing member 30d. With particular conditions and materials, such as PDMS, opening 230 may generally be formed as a series of fissures or holes. Without wishing to be limited to any particular theory, it is believed that these fissures are caused by stresses occurring during breakdown, such as gas evolution and expansion, thermal stress, and chemical bond breaking. Suitable combinations of voltage and voltage pulse length to achieve an opening of a desired size/shape may be determined for a particular arrangement using routine experimentation.

Where a voltage pulse is applied to a closing member to open it, bubbles of gas may be formed in liquid-containing fluid paths adjacent the closing member after the connection is opened. The magnitude and length of a voltage pulse may affect the size of these bubbles. Lower magnitude, shorter voltage pulses may reduce bubble formation, while larger magnitude, longer voltage pulses may promote bubble formation. Without wishing to be limited to any particular theory, it is believed that high local temperatures accompanying the electrical breakdown of the closing member results in bubbles. Where bubbles are formed, such bubbles may dissipate. For example, bubbles formed from breakdown of 20 micrometer thick PDMS closing members may dissipate after about 30 seconds. Bubbles may also be moved out of the fluid paths, for example by pumping via applied pressure. Such pumping may be performed manually where the microfluidic system includes flexible fluid paths.

Microfluidic systems incorporating one-use valves may be used in any application where it is desired to keep the fluid paths separated until a particular time. For example, fluids, such as reagents, analytes, and buffers may be stored in fluid paths. In microfluidic systems having multiple channels separated by one-use valves, opening the valves in a predetermined sequence may allow complex analyses and chemical reactions to be performed. For example, a microfluidic device for use in ELISA (Enzyme-Linked Immunosorbent Assay) experiments, which require several solutions be added separately and in a specific order, may be created using the one-use valves of the present invention; these solutions may include capture antibody, blocking agent, sample, antibody-enzyme conjugate, and enzyme substrate. Microfluidic fluid paths are especially suitable for ELISA because the relatively high ratio of surface area to volume reduces the effect of mass transport limitations. Furthermore, where PDMS is used to create some or all of the microfluidic system, some common capture antibodies for use with ELISA are readily adsorbed onto oxidized PDMS. Other potential uses for microfluidic systems incorporating one-use valves include chemical analysis, drug delivery, and chemical synthesis.

Microfluidic system 10 as thus far described is suitable for use as a valve. Referring now to FIGS. 12-15, microfluidic system 10e may be expanded for use as a pump. In one embodiment of microfluidic system 10e for use as a pump, microfluidic system 10e further includes a second closing member 31 disposed along fluid path 20e between inlet 22e and outlet 24e and a reservoir 40 disposed along fluid path 20e between first closing member 30e and second closing member 31. As used herein, "reservoir" refers to any structure generally intended to hold a volume of fluid. Reservoirs may also function as fluid paths in that fluid may pass through them at times and fluid paths may sometimes function as reservoirs in that they may sometimes be used to hold fluid. Second closing member 31 may be constructed in any manner and of any material or materials previously described for closing member 30e. According to the embodiments of the invention illustrated in FIGS. 12-15, closing members 30e, 31 operate as check valves 12e. In this embodiment, check valves 12e allow fluid to flow through fluid path 20e only in the first direction, from inlet 22e to outlet 24e.

Reservoir 40 may be constructed in any manner and of any material or materials that do not adversely affect, and are not adversely affected by, fluid in reservoir 40 and allow the pressure in reservoir 40 to be varied. Increasing the pressure in reservoir 40 beyond the pressure in fluid path 20e may force fluid within reservoir 40 out of reservoir 40. However, check valves 12e allow fluid to flow only in the first direction (illustrated by flow indicators 50e in FIG. 12). Accordingly, fluid will flow toward outlet 24e, but will not be permitted to flow toward inlet 22e. Conversely, decreasing the pressure within reservoir 40 to below the pressure within fluid path 20e may draw fluid into reservoir 40. Once again, check valves 12e allow fluid to flow only in the first direction. Accordingly, fluid will be drawn from the direction of inlet 22e into reservoir 40, but will not be permitted to flow in the second direction from outlet 24e toward reservoir 40. It will now be apparent that by alternately increasing and decreasing the pressure in reservoir 40 it is possible to pump fluid through fluid path 20e from inlet 22 to outlet 24e. The speed of the pressure changes and the volume of reservoir 40 are generally directly proportional to the speed the fluid is pumped.

In a preferred embodiment, reservoir 40 is constructed such that the volume of reservoir 40 is variable, allowing the pressure within reservoir 40 to be varied by varying the volume of reservoir 40. Where the volume of reservoir 40 is variable, it may be variable due to the flexibility of reservoir 40. Accordingly, pressure applied externally to reservoir 40 may deflect reservoir 40, decreasing its volume and correspondingly increasing the pressure within it and pumping fluid toward outlet 24e. If reservoir 40 is elastomeric, when the external pressure is removed from reservoir 40 it will return to its original shape, increasing its volume, decreasing the pressure within it, and drawing fluid from inlet 22e. Accordingly, reservoir 40 is preferably constructed from an elastomeric material, such as the polymers discussed previously. Reservoir 40 may be constructed according to the rapid prototyping technique described later herein. Where desired, this process may be modified to increase the volume of reservoir 40. For example, the portion of the master corresponding to the reservoir may be constructed to be thicker than the rest of the master, leading to a larger reservoir 40. In one embodiment, the portion of the master corresponding to the reservoir may have an additional material, such as an epoxy, added thereto to increase its thickness and, thus, the volume of reservoir 40. Such an arrangement may also allow the upper wall of reservoir 40 to be made thinner, allowing its volume to be more easily adjusted.

Figure 12:
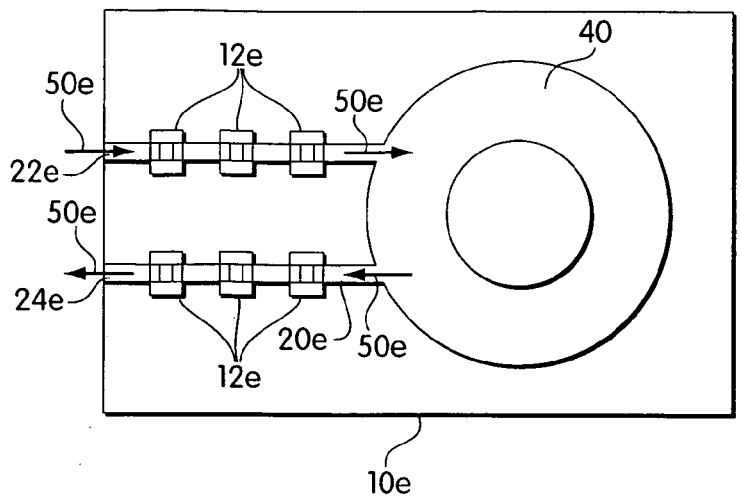
FIG. 12 is a transparent, plan view of one embodiment of a microfluidic system of the present invention, configured as a pump.
Figure 13:
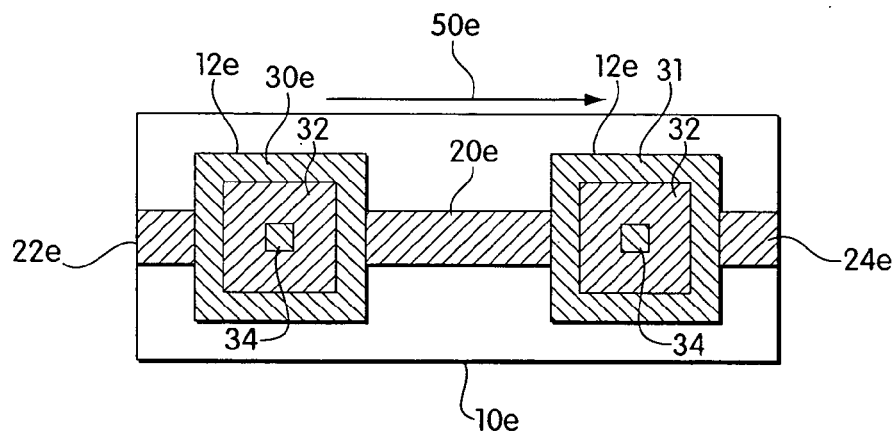
FIG. 13 is a transparent, plan view of one embodiment of a microfluidic system according to the present invention, including a flow indicator and cross-hatching to show the presence of a fluid within the microfluidic system.
Figure 14:
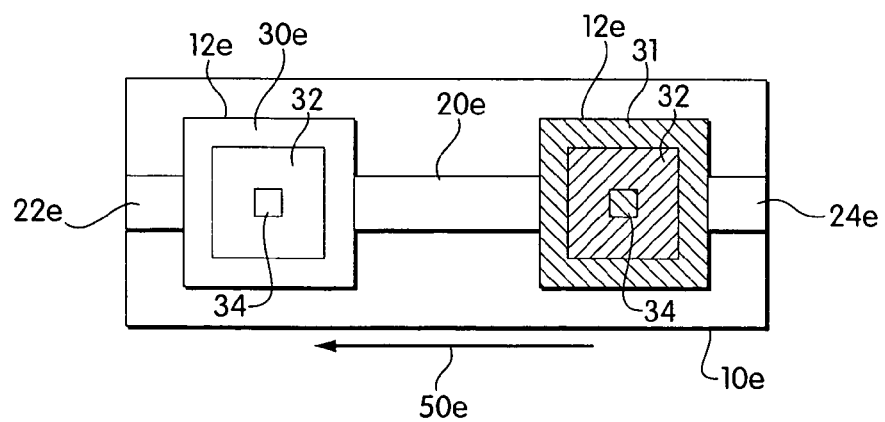
FIG. 14 is a transparent, plan view of the microfluidic system illustrated in FIG. 13, also having a flow indicator and the presence of fluid marked by cross-hatching.
Figure 15:
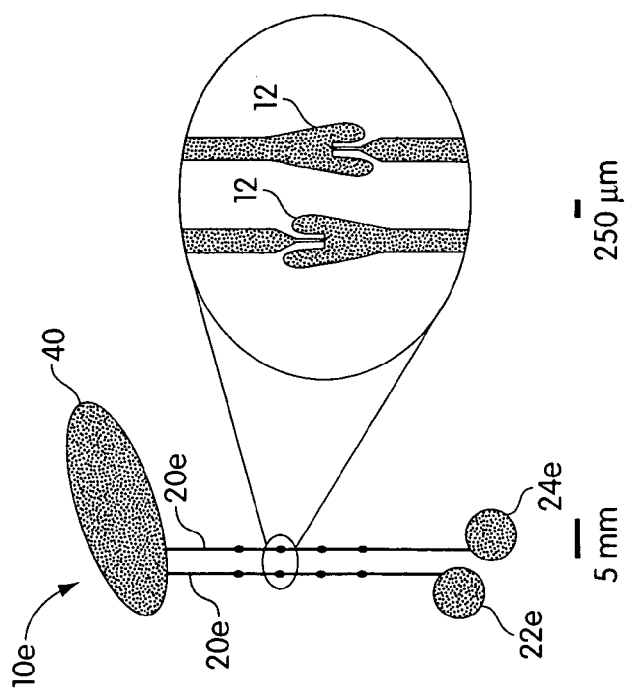
FIG. 15 is a plan view of one embodiment of a microfluidic system according to the present invention, configured as a pump, and including a magnification of one portion of the microfluidic system.

As illustrated in FIGS. 12 and 15, microfluidic system 10e for use as a pump may include more than one check valve 12e along flow path 20e before and after reservoir 40. For example, two, three or more check valves 12e may be included on either side of reservoir 40 to inhibit back-flow during actuation of the pump. In one embodiment, similar to that illustrated in FIG. 15, a pressure of about 150 Pa (Pascals) was generated in the adjacent fluid paths by compression of reservoir 40 with a flow rate of about 0.66 microliters per stroke.

Where microfluidic system 10e for use as a pump includes reservoir 40 having a variable volume, the volume may be varied in any manner that produces the desired pumping function. For example, where reservoir 40 is constructed of an elastomeric material, the volume of reservoir 40 may be varied manually. Such a reservoir may be sized and shaped to complement a thumb or finger; for example, it may be roughly oval and about 2 square cm. In another example, microfluidic system 10e may be constructed with a second reservoir adjacent to reservoir 40 and a fluid, such as air, may be pumped into and out of the second reservoir such that it compresses or expands the second reservoir and correspondingly expands or compresses reservoir 40 due to its proximity in the elastomeric material.

Microfluidic system 10 according to the present invention may be flexible. For example, where components of microfluidic system 10 are constructed of a flexible material some, or all, of microfluidic system 10 may be flexible. Some embodiments of microfluidic system 10 of the present invention may be constructed entirely of elastomeric polymers, such as PDMS. Flexible microfluidic systems according to the present invention are resistant to breakage and may be bent or twisted. For example, microfluidic system 10 may be constructed for use as an assaying device for fieldwork, such as on-site environmental testing or medical diagnosis. In such a device a lengthy fluid path 20 may be desirable to promote a reaction or separation, but may interfere with portability. According to the present invention the microfluidic system 10 could be coiled, allowing a lengthy fluid path 20 to be contained within a relatively small space.

In some instances where microfluidic system 10 is flexible, it may be desirable to increase its structural stability and ability to resist damage or deformation. In this case, it is preferred to provide support to microfluidic system 10. Preferably, support is provided without compromising the flexibility of microfluidic system 10. For example, microfluidic system 10 may be supported on a support 110 (see FIG. 18). Support 110 may be flexible and may be constructed in any manner and of any material or materials that provide the desired degree of support, stability and flexibility to microfluidic system 10. For example, support 110 may be constructed of a polymer.

Support 110 may be connected to microfluidic system 10 in any manner and using any materials that provide the desired connection. For example, in some embodiments, it may be desired to form a reversible connection to microfluidic system 10, and, in others, an irreversible connection. Support 110 may be connected to microfluidic system 10 using an adhesive, such as a conventional pressure-sensitive adhesive. In some instances, conventional adhesive tapes may perform as suitable supports. For example, an adhesive tape with a silicone adhesive on a polyester backing is a suitable support 110 for some applications.

Microfluidic system 10 according to the present invention may be constructed using any method that will repeatably produce microfluidic system 10 having the desired structure and functionality. For example, microfluidic system 10, or portions of microfluidic system 10, may be constructed by conventional etching techniques known in the art. Preferably, microfluidic system 10 is constructed according to the method of the invention, as disclosed herein.

Figure 18:
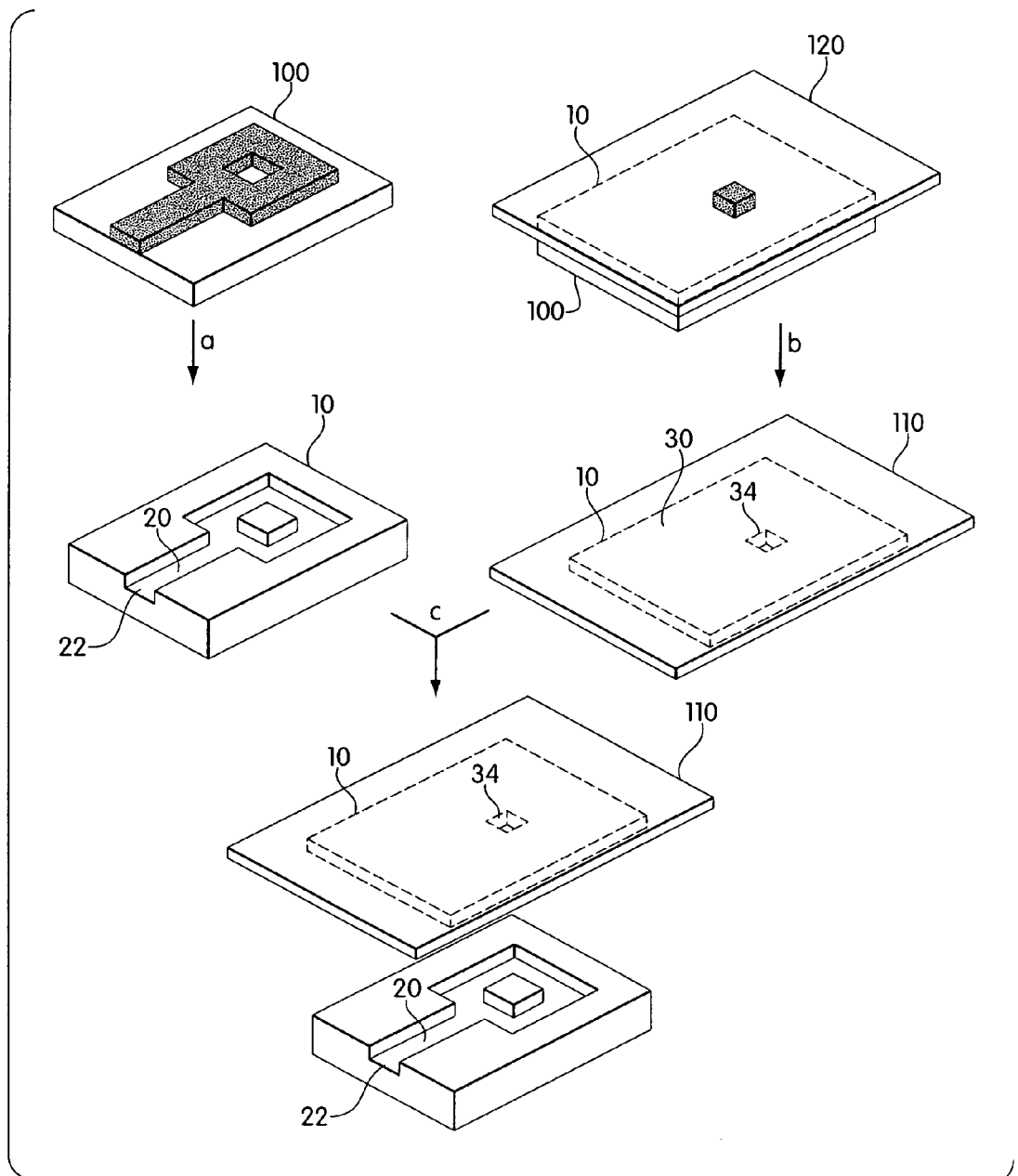
FIG. 18 is a schematic view of one embodiment of a method for making microfluidic systems of the present invention.

Referring now to FIG. 18, in one embodiment, a method for making a microfluidic system includes providing a master 100 corresponding to microfluidic system 10, forming microfluidic system 10 on master 100, connecting support 110 to microfluidic system 10, and removing microfluidic system 10 from master 100.

The act of providing master 100 corresponding to microfluidic system 10 may be performed in any manner that produces master 100 corresponding to microfluidic system 10. For example, master 100 may be produced by conventional etching techniques. More specifically, in one embodiment, master 100 corresponding to microfluidic system 10 may be constructed by producing high resolution transparencies according to computer designs, such as CAD drawings, corresponding to the design of microfluidic system 10. These transparencies may then be used as masks when transferring a pattern into negative photoresist by conventional photolithography, yielding a master with positive relief of fluid paths 20 and other features of microfluidic system 10. This method is described in more detail in "Rapid Prototyping of Microfluidic Systems in Poly(dimethylsiloxane)." *Anal. Chem.* 1988, 70, 4974-4984., which is hereby incorporated by reference in its entirety. In FIG. 18, two masters 100 are illustrated, one corresponding to a flow path 20 for use with diaphragm closing member 30 and the other corresponding to diaphragm closing member 30.

The act of forming microfluidic system 10 on master 100 may be performed in any manner that produces microfluidic system 10 capable of providing desired fluid flow properties. For example, microfluidic system 10 may be cast or molded onto master 100. In one embodiment, a moldable polymer or prepolymer may be placed in contact with master 100 and polymerized or cured such that it has sufficient rigidity to provide desired fluid flow properties in microfluidic system 10. The desired stiffness may vary with the intended application for microfluidic system 10. For example, if microfluidic system 10 is desired to be flexible, it is preferred to use a flexible polymer. In a preferred embodiment, forming microfluidic system 10 on master 100 is performed by replica molding against the master and the preferred material is PDMS.

As illustrated in FIG. 18, in some embodiments, a secondary master 120 may be used. For example, where microfluidic system 10 includes flow path 20 with features on both sides of microfluidic system 10, such as flow path 20 or opening 34 passing through microfluidic system 10, a secondary master 120 may be used. Accordingly, secondary master 120 may corresponding to the side of microfluidic system 10 facing away from master 100. In some embodiments, such as that illustrated in FIG. 18, secondary master 120 may include a flat sheet to squeeze excess material out of master 100 and to ensure that flow path 20 passing through microfluidic system 10 is not blocked by such material. Pressure may be exerted upon secondary master 120 to ensure the desired amount of material is squeezed out of master 100. The pressure exerted may depend, for example, on the type of material being used to form microfluidic system 10 and the amount of material that must be squeezed out of master 100. In some instances, pressure of about 1 pound per square inch (psi) may be applied to secondary master 120. Preferably, secondary master 120 is formed of a material that is easily removed from microfluidic system 10, such as Teflon® polytetrafluoroethylene ("PTFE") available from DuPont Corporation of Delaware. Secondary master 120 may be treated to ensure that it is smooth.

The act of connecting support 110 to microfluidic system 10 may be performed in any manner that provides the desired degree of connection. For example, in some embodiments, it may be desired to form a temporary connection only strong enough to pull microfluidic system 10 from master 100, while in other embodiments it may be desired to for an irreversible connection as has been previously discussed.

The act of removing microfluidic system 10 from master 100 may be performed in any manner that will not damage microfluidic system 10. For example, support 110 may be lifted away from master 100, pulling microfluidic system 10 with it. After microfluidic system 10 is removed from master 100, support 110 may remain attached the microfluidic system 10, serving as a substrate, or support 110 may be used to facilitate transfer to another substrate or microfluidic system, as will be discussed below. Where support 110 is used to facilitate transfer of microfluidic system 10, as illustrated for closing member 30 in FIG. 18, support 110 may be removed from microfluidic system 10 when the transfer has been accomplished. The act of removing support 110 from microfluidic system may be performed in any manner that does not harm microfluidic system 10. For example, if an adhesive was used to connect support 110 to microfluidic system 10, a material may be used to dissolve the adhesive without dissolving or damaging microfluidic system 10. For example, an appropriate solvent may be used.

Microfluidic system 10 formed by the method of the invention may be combined with other microfluidic systems 10 to form larger microfluidic system 10. For example, a more complex microfluidic system 10, such as a microfluidic system intended for use as a valve or a pump, may be formed as layers according to the method of the invention and then connected. In most embodiments, it is preferred that such connections between layers of microfluidic system 10 be substantially irreversible. For example, FIG. 18 illustrates making a portion of microfluidic system 10 configured as a diaphragm valve, such as that illustrated in FIGS. 4-6, from two microfluidic systems 10, one including fluid path 20 and the other configured as closing member 30.

EXAMPLES

Example 1

A rapid prototyping method was used for the design and fabrication of microfluidic valves and pumps. First, high-resolution transparencies were produced from a CAD file containing a design of fluid paths. These transparencies were used as masks in transferring the design into negative photoresist by conventional photolithography, yielding a master with positive relief of fluid paths.

The valves were made from two molded PDMS bas-relief plates and a membrane. As illustrated in FIG. 18, the parts were fabricated separately and later assembled to complete the valves. First, one PDMS bas-relief plate was constructed (a) by replica molding against the master using procedures known in the art.

A PDMS membrane was constructed (b) by casting and curing the PDMS prepolymer between a master and a secondary master in the form of a Teflon® PTFE sheet (1 mm thick Teflon® FEP, DuPont, Del). Modest pressure (1 psi) was applied to the secondary master/PDMS/master sandwich while curing to squeeze out excess PDMS prepolymer. The PDMS membranes were 25-100 µm thick, as thick as the negative resist (SU-8, MicroChem, MA) used in making the master. A master with photoresist posts, as shown in FIG. 18, was used to obtain PDMS membranes with through-holes. Prior to use as the secondary master, the Teflon® PTFE sheet was molded against a flat Si wafer surface at 300° C. ($T_g$=270° C.) to obtain a smooth surface.

After curing, the secondary master was removed to leave behind the PDMS membrane attached to the master. A pressure sensitive adhesive (PSA, Furon M803 adhesive tape with silicone adhesive on polyester back, Furon, Conn.) was applied on the PDMS membrane as a support. Due to stronger adhesion between the support and PDMS compared to that between PDMS and master, it was possible to transfer the membrane from the master to the support by peeling the support away from the master. The membrane, once transferred onto the support, could be handled without distortion. The support was removed by applying appropriate solvents (acetone or ethanol) after manipulation.

The support/PDMS membrane was placed in an aligner and bonded (c) with PDMS bas-relief plate to form the lower part of the valve. The aligner was constructed from a set of x-y-z micrometer stages mounted on a translation post. The patterned PDMS membranes (supported on support or master) and bas-relief plates were placed on the top and bottom micrometer stages and aligned using a stereo microscope. Irreversible bonding of the PDMS pieces was achieved by surface modification by oxygen plasma treatment. After alignment, the assembly containing the aligner and the PDMS pieces were placed in oxygen plasma (Harrick, Pa.) for 30 sec. (60 W, 200 mTorr). The PDMS pieces were brought into contact immediately after they were removed from the plasma generator. Complete, functional valves were fabricated by repeating (c) with another bas-relief plate that forms the top fluid path.

Example 2

Microfluidic systems incorporating one-use valves were constructed of two layers, one layer with embedded fluid paths and one flat layer. To fabricate the layer with the fluid paths, PDMS was molded against a photolithographic master produced by rapid prototyping and comprising a positive relief of photoresist on a silicon wafer. (See "Rapid Prototyping of Microfluidic Systems in Poly(dimethylsiloxane)." Anal. Chem. 1988, 70, 4974-4984.) Holes were cut in the PDMS using circular punches to form fluid reservoirs. The layer with fluid paths was sealed against a flat piece of PDMS or a glass slide by oxidizing both layers in an air plasma and then bringing them into conformal contact. The plasma oxidation used in the sealing process rendered the channels hydrophilic, and they were readily filled with aqueous buffer. Dead-end channels filled by capillary action in less than 5 minutes. The microfluidic systems included of at least two disconnected channels separated by 20 µm closing members, for example as shown in FIGS. 24-25. This separation was limited by the resolution of the printing used in the first step of rapid prototyping. A higher-resolution printer would allow thinner separations and lower voltages to operate. The channels were 50 or 100 µm wide and 60 µm tall.

Example 3

The valves constructed in Example 1 were tested for long-term operation using an external three-way electromechanical valve (Lee Valve, Westbrook, Conn.) connected to a pressurized air source (functionality of the valves was tested with liquids before and after long-term testing with pressurized air). The inlet of the valve was connected to the electromechanical valve which pressurized and vented the valve at ~10 Hz. The outlet of the valve was submerged in a water bath and the generation of a bubble with each opening and closing was monitored. The PDMS diaphragm valves were tested continuously for $10^5$ openings and closings. The valves did not show any marked deterioration and were fully functional when tested with fluids (water).

Both diaphragm and flap valves were still fully functional when tested after storing them for six months in the open laboratory. Only the valves that had dried solids around the membrane that could not be removed were not functional. The ones with particle/deposit that were washed and cleaned functioned without any problems.

Example 4

In order to demonstrate the effectiveness of one embodiment of a valve according to the present invention in reducing back flow, flow tests were performed on a valve as illustrated in FIGS. 8, 9, 19 and 20. Closing members 30a were connected to three of four walls (the two sides and the bottom) of a rectangular fluid path 90 micrometers high and 150 micrometers wide. The width of the fluid path in the area of closing members 30a was greater than the width elsewhere in the fluid path. Closing members 30a were designed not to touch at rest, with no fluid flowing, and were separated by 20 micrometers. Closing members 30a were the same height as fluid path 20 (90 micrometers) and tapered from the walls of fluid path 20 to a width at their ends of approximately 20 micrometers. The dimensions of the valves depicted in FIGS.

8-9 are about 40% larger than those used in this example. The top of each closing member 30*a* where it abutted the top of fluid path 20 was coated with petroleum jelly for lubrication, as illustrated by shading in FIG. 19.

For the particular dimensions of this embodiment, a back pressure of approximately 1.7 kPa (kilopascals) was required to bring together closing members 30. Back flow rates between 0 microliters per second and 0.3 microliters per second (0.3 microliters per second corresponded to 1.7 kPa) resulted in slight opening of closing members 30*a* resulting in reduced pressure drop. However, as soon as a back flow of 0.3 microliters per second was reached, the closing members were pushed together by the pressure.

Figure 21:
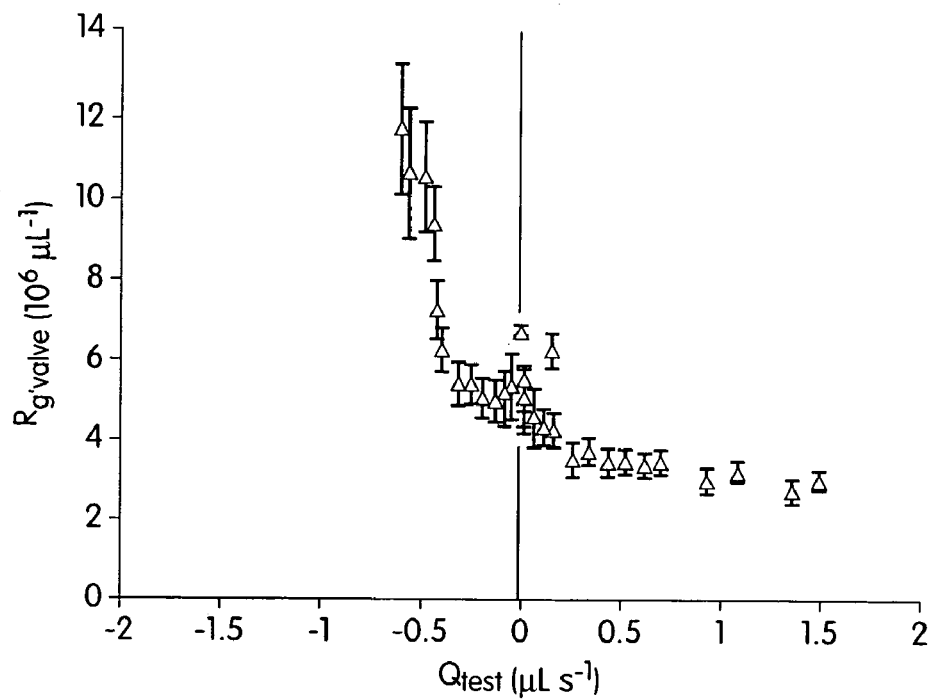
FIG. 21 is a graph of fluid resistance versus flow rate.
Figure 22:
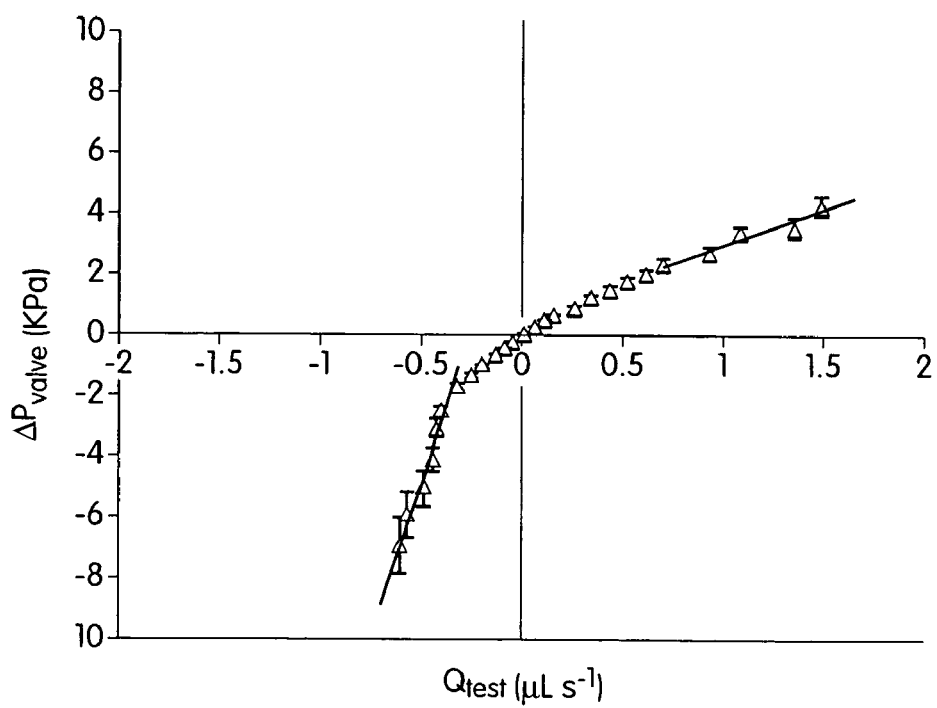
FIG. 22 is a graph of pressure drop versus flow rate.

FIGS. 21 and 22 are graphs of the resistance of the valve versus the flow rate through the valve and pressure drop across the valve versus the flow rate through the valve, respectively. FIG. 22 illustrates that the partial closure of closing members 30*a* is more abrupt than their opening. Based on the slopes of pressure drop versus flow rate, three states of the valve may be defined: "closed" at large negative (back flow) flow rates, "neutral" at low flow rates, and "fully open" at relatively large positive flow rates. The linear regression of the pressure drop versus flow rate curve is an alternative measure of the fluidic resistance over each of the regions. The resistance of the valve was $20 \times 10^6$, $4.4 \times 10^6$, and $2.4 \times 10^6$ $\mu L^{-1}$ in the closed, neutral, and open positions, respectively. The resistance to flow across the valve of this embodiment was therefore approximately 8 times greater for back flow than for forward flow. This demonstrates that this embodiment of the valve of the present invention is effective as a check valve. Without wishing to be limited to any particular theory, it is believed that the inhibition, as opposed to nearly complete stoppage, of flow was due to the gap at the bottom of the fluid path where the closing members are not free to move together, as well as gaps at the top of the fluid path where the closing members are not connected.

Example 5

In order to demonstrate the effectiveness of the seal between the components of the embodiment of the microfluidic system described in Example 4, the microfluidic system was exposed to increasing fluid pressures. The microfluidic system withstood fluid pressures from 300-500 kPa, demonstrating that an effective seal was formed between the components.

Example 6

In order to demonstrate the durability of the microfluidic system described in Example 4, the microfluidic system was set to open and close through 40,000 cycles over 11 hours. The microfluidic system suffered no obvious fatigue or decrease in performance as a result, demonstrating the durability of the microfluidic system.

Also to demonstrate durability of the microfluidic system described in Example 4, the microfluidic system was filled with a sodium chloride solution and the liquid was evaporated leaving a salt crust on the fluid paths and closing members. Function was restored upon rehydration, again demonstrating durability of the microfluidic system.

Example 7

In order to determine the effect of applied voltage on opening size and minimum pulse length for one-use valves, experiments were performed at several voltages. PDMS closing members 20 micrometers thick were used in the experiments. After the openings were formed, fluorescein was pumped through the openings. The results of some of these experiments are shown in FIGS. 30-33, which are photocopies of fluorescent micrographs of openings formed by voltages of 1 kV, 2 kV, 5 kV and 10 kV, respectively. Voltages from 1 kV to 5 kV were applied by a commercial power supply (CZE1000R, Spellman High Voltage, Hauppauge, N.Y.) controlled by an analog output board (PCI-MIO-16XE-50, National Instruments, Austin, Tex.) and LabVIEW ® software (National Instruments), while the approximately 10 kV voltage was applied by a gas igniter (Weber-Stephen Products, Burlington, Canada).

Openings were formed in one second for 1 kV, 50 milliseconds for 2 kV, 20 milliseconds for 5 kV, and 20 microseconds for 10 kV. Voltages greater than 2 kV achieved reproducible openings, but the size and shape of the openings were variable. Where openings were formed, the approximate average diameters openings were 5 micrometers for 1 kV, 20 micrometers for 2 kV, 50 micrometers for 5 kV and 5 micrometers for 10 kV (supplied by the gas igniter). Without wishing to be limited to a particular theory, it is believed that the smaller hole at 10 kV was due to the very short duration of the pulse generated by the igniter or to the fact that that the power generated by the igniter was less than that produced by the commercial power supply. The pressure required to pump the fluorescein through the openings was greatest for the opening formed by 1 kV and least for the opening formed by 5 kV. The results of these experiments demonstrate that higher voltages generally produce larger holes and require shorter pulses to form openings.

Example 8

Experiments were performed in order to determine the effect of the ionic strength of a fluid positioned within fluid paths 20*d*, 220, on the opening of a one-use valve. As ionic fluids PBS (10 mM (millimolar) phosphate, 138 mM NaCl, 2.7 mM KCl, pH 7.4, I (Ionic strength) approximately 166 mM) and Tris-Gly (25 mM Tris-192 mM Gly, I approximately 10 mM) containing 0.1 micromolar fluorescein were used. The experiments were performed in a microfluidic system such as that illustrated in FIG. 23, where two fluid paths 20*d*, 200 are separated by a PDMS closing member 30*d* approximately 20 micrometers in thickness. A voltage of −5 kV was applied to fluid path 20*d*, with fluid path 220 grounded.

Figure 34:
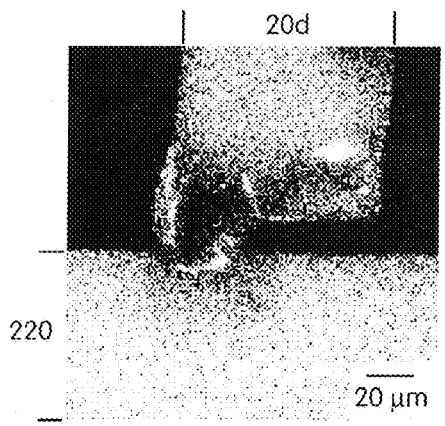
FIG. 34 is a photocopy of a photomicrograph of one embodiment of a microfluidic system of the present invention configured as a one-use valve in an open position.
Figure 35:
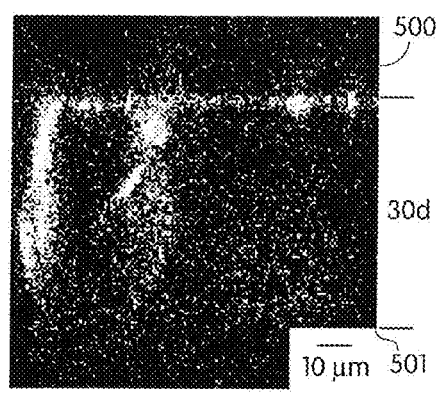
FIG. 35 is a photocopy of a photomicrograph of another aspect of the microfluidic system of FIG. 34.
Figure 36:
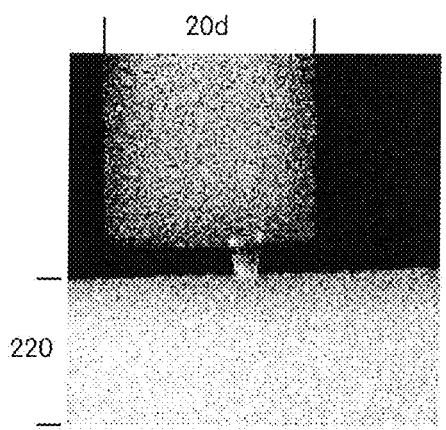
FIG. 36 is a photocopy of a photomicrograph of one embodiment of a microfluidic system of the present invention configured as a one-use valve in an open position.
Figure 37:
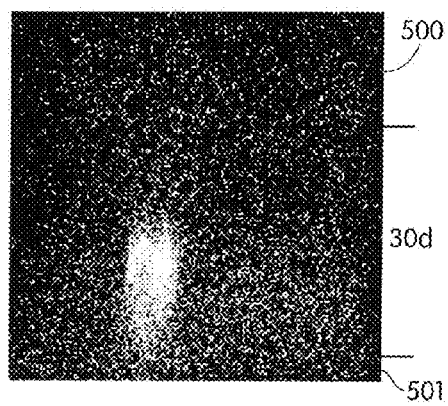
FIG. 37 is a photocopy of a photomicrograph of another aspect of the microfluidic system of FIG. 36.

The results of these experiments are shown in FIGS. 34-37, wherein white regions indicate the presence of fluorescein, thus, fluid. FIGS. 34 and 36 show horizontal sections 2.6 micrometers thick of the closing members (See FIG. 23). FIG. 34 shows the opening formed with a PBS buffer. The opening is halfway between the PDMS-glass seam (top the fluid path) and the bottom of the fluid path. FIG. 36 shows the middle of an opening formed with the Tris-Gly buffer (approximately 5 micrometers from the PDMS bottom of the channel). FIGS. 35 and 37 show vertical sections (2 micrometers thick) of connections half way between fluid paths 20*d*, 220 (10 micrometers from either channel). Closing member 30*d* is positioned between a glass support 500 and a PDMS base 501. FIG. 35 shows an opening formed with PBS. This opening extended from the top to the bottom of the fluid path and consisted primarily of two fissures, each about 10 micrometers in average diameter. FIG. 37 shows the approximately 10 micrometer average diameter opening (height of about 30 micrometers) formed with the Tris-Gly buffer. These experiments demonstrate that a buffer with a higher ionic strength produces larger holes than a buffer with a lower ionic strength.

Example 9

In order to determine the minimum voltage required to form an opening, experiments were performed using a 20 micrometer thick PDMS closing member with both Tris-Gly and PBS buffers (as used in Example 8). The theoretical voltage to open such a closing member is 420 V. Current flow was observed at 500 V, but formation of openings was not reproducible at this voltage. Openings formed more frequently as the voltage was increased to 600 V, 750 V, and 1 kV, but again the results were not reproducible. In some cases it was possible to open a connection by repeatedly applying a given voltage or applying a higher voltage across a smaller opening. Without wishing to be limited to any particular theory, it is believed that these variations are due to heterogeneities in the PDMS. These experiments demonstrate that voltages higher than the theoretical minimum may be required to produce openings in some instances and that higher voltages are more likely to form openings.

Example 10

Figure 38:
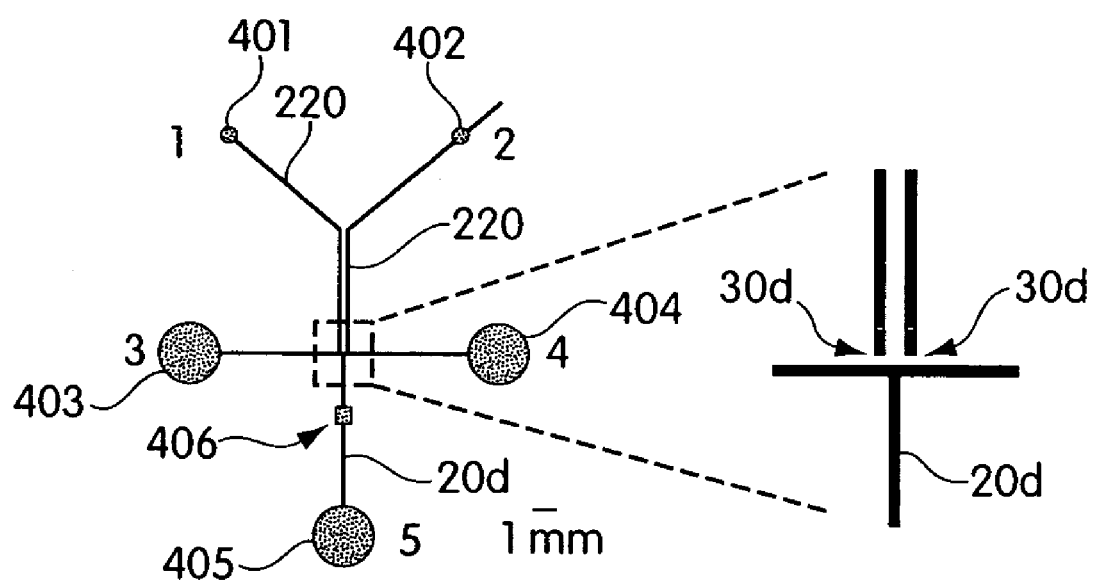

In order to demonstrate that the one-use valves of the present invention can be used to produce relatively complex microfluidic systems, an ELISA device was developed. This device is illustrated in FIG. 38 and included 5 reservoirs 401-405. A "T" shaped fluid path 20d connected reservoirs 403-405; each of these reservoirs had an average diameter of 4 mm. Reservoir 405 served as a reservoir for waste, and reagents, sample, and rinse solution were added in reservoirs 403 and 404. Reservoirs 401 and 402, which were approximately 1 mm in average diameter, were disconnected from fluid path 20d, but were connected to syringes containing reagents and to closing member 30d by fluid paths 220. A detection chamber 406 in fluid path 20d was used to present a larger surface (600×600 micrometers) area for observation. Coupling from the syringes (1 mL, Henke-Sass, Wolf, Tuttlingen, Germany) to the device was accomplished by using polyethylene tubing (outer diameter 1.09 mm, inner diameter 0.38 mm, Becton Dickinson, Franklin Lakes, N.J.) that was pressure fit into reservoirs 401, 402. Flow of the coating antibody, rinsing solution, and sample was by hydrodynamic pressure from 50 microliters of fluid in reservoirs 403 and 404 to reservoir 405.

Figure 39:
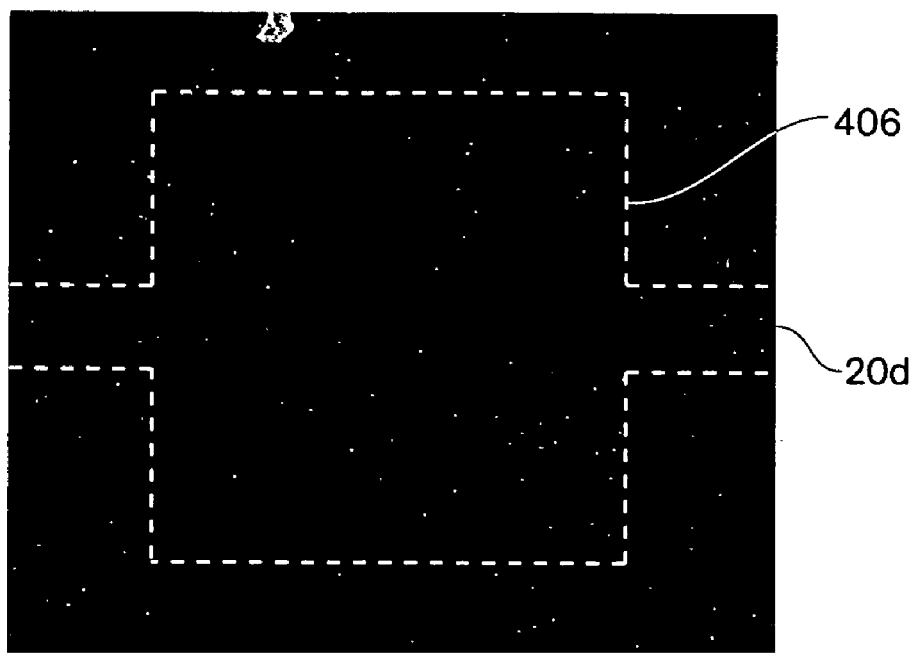
FIG. 39 is a photocopy of a photomicrograph of one embodiment of a microfluidic system of the present invention.
Figure 40:
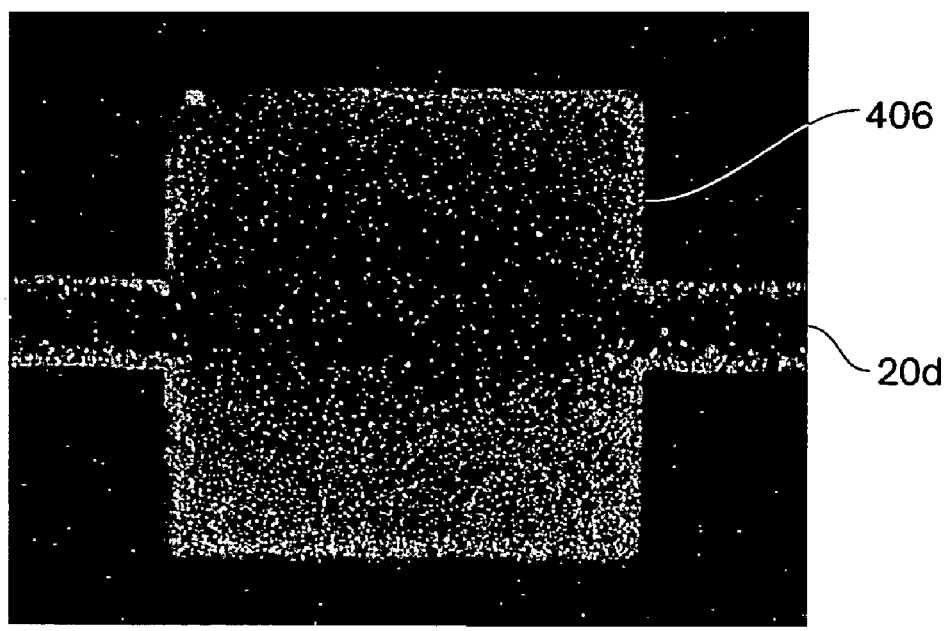
FIG. 40 is a photocopy of a photomicrograph of another aspect of the microfluidic system of FIG. 39.

Antibodies and buffers for the ELISA were obtained from Bethyl Laboratories (Montgomery, Tex.). Human hemoglobin (Hb) was used as the analyte. The Hb-specific capture antibody (sheep anti-human Hb, 10 micrograms per milliliter, in 50 mM $Na_2CO_3$, pH 9.6) was added through reservoirs 403 and 404 to coat fluid path 20. A solution of bovine serum albumin (BSA, 1% in 50 mM Tris, 150 mM NaCl, pH 8) was flowed into fluid path 20d for one hour to block the surface and to prevent non-specific adsorption of proteins in subsequent steps. After the sample was introduced through fluid path 20d, a 1 second pulse of 1 kV was used to create an opening in closing member 30d between fluid path 220 connected to reservoir 401 and fluid path 20. Anti-Hb antibody conjugated to alkaline phosphatase (sheep anti-human Hb, 10 micrograms per milliliter in 1% BSA, 50 mM Tris, 150 mM NaCl, pH 8) was pumped into fluid path 20d with a syringe pump for one hour. Fluids were pumped at a constant rate of 50 microliters per hour. Finally, an opening was formed in closing member 30d between fluid path 20d connected to reservoir 402 and fluid path 220 with a 1 second pulse of 1 kV. The substrate, ELF-97 (0.5 mM in 1% BSA, 50 mM Tris, 150 mM NaCl, pH 8, Molecular Probes, Eugene, Oreg.), was pumped into the device for 10 minutes. ELF-97 was soluble and non-fluorescent when phosphorylated. Between each step, fluid path 20d was rinsed with two aliquots of 50 microliter of 50 mM Tris, 100 mM NaCl, 0.05% Tween® 20 (ICI America, North Little Rock, Ak.), pH 8. Upon hydrolysis of the phosphate group by alkaline phosphatase, however, the species precipitated and fluoresced green upon exposure to UV light. If no Hb was present in the sample, the substrate did not react, and no fluorescence was observed, as illustrated in FIG. 39. If Hb was present, the substrate reacted, and, after about 5 minutes, fluorescence was observed in the device as shown in FIG. 40. Although fluorescent microscopy was used to document the results, the results were able to be seen by the naked eye with a UV lamp. This experiment demonstrates that a relatively complex assaying device may be created using the one way valves of the present invention.

It will be understood that each of the elements described herein, or two or more together, may be modified or may also find utility in other applications differing from those described above. While particular embodiments of the invention have been illustrated and described, the present invention is not intended to be limited to the details shown, since various modifications and substitutions may be made without departing in any way from the spirit of the present invention as defined by the following claims.

What is claimed is:

1. A microfluidic system comprising:
   a fluid path;
   an inlet to the fluid path;
   an outlet to the fluid path;
   a first closing member disposed along the fluid path between the inlet and the outlet, wherein the first closing member comprises a check valve;
   a second closing member disposed along the fluid path between the inlet and the outlet; and
   a reservoir disposed along the fluid path between the first closing member and the second closing member,
   wherein the fluid path has a cross-sectional dimension of less than about 500 µm, and
   wherein the fluid path is formed in a polymeric material.

2. The microfluidic system of claim 1, wherein the first closing member comprises a first flexible member.

3. The microfluidic system of claim 2, wherein the first closing member has an open position and a closed position and is constructed and arranged to travel from the closed position to the open position without sliding against any portion of the microfluidic system.

4. The microfluidic system of claim 2, wherein the first flexible member comprises a flap.

5. The microfluidic system of claim 4, wherein the flap is generally semicircular in shape.

6. The microfluidic system of claim 2, wherein the first flexible member comprises a diaphragm.

7. The microfluidic system of claim 6, wherein the diaphragm comprises an opening.

8. The microfluidic system of claim 7, further comprising a seat constructed and arranged to support the diaphragm around at least the periphery of the opening.

9. The microfluidic system of claim 2, wherein the first flexible member comprises an elastomer.

10. The microfluidic system of claim 1, wherein the first closing member comprises a first free-floating member.

11. The microfluidic system of claim 10, wherein the first free-floating member comprises a spherical body.

12. The microfluidic system of claim 1, wherein the fluid path is constructed of a flexible material.

13. The microfluidic system of claim 12, wherein the fluid path is constructed of an elastomer.

14. The microfluidic system of claim 12, further comprising:
a flexible support connected to the flexible material.

15. The microfluidic system of claim 1, wherein a volume of the reservoir is variable.

16. The microfluidic system of claim 1, wherein the reservoir comprises an elastomer.

17. The microfluidic system of claim 1, wherein the fluid path has a cross-sectional dimension of less than about 300 μm.

18. The microfluidic system of claim 17, wherein the fluid path has a cross-sectional dimension of less than about 100 μm.

19. The microfluidic system of claim 18, wherein the fluid path has a cross-sectional dimension of less than about 50 μm.

20. The microfluidic system of claim 1, wherein at least one of the first and second closing members comprises a substantially sealed barrier and further comprising an electrode electrically connected to at least one of the inlet of the fluid path and the outlet of the fluid path.

21. The microfluidic system of claim 1, wherein the first closing member has an open position and a closed position and is constructed and arranged to travel from the closed position to the open position or from the open position to the closed position by the flow of a fluid in the fluid path from the inlet to the outlet.

22. The microfluidic system of claim 21, further comprising a flexible support connected to the fluid path.

23. The microfluidic system of claim 22, wherein the flexible support is an adhesive tape.

24. A method for opening the check valve of the microfluidic system of claim 1, comprising:
providing a flow of a fluid through the fluid path; and
deflecting the first closing member with the flow from a closed position to an open position without the first closing member sliding against any portion of the check valve.

25. A method for manipulating a flow of a fluid in the microfluidic system of claim 1, comprising:
initiating the flow of the fluid through the fluid path in a first direction; and
inhibiting the flow of the fluid through the fluid path in a second direction.

26. A microfluidic system as in claim 1, wherein the first closing member has an open position and a closed position and is constructed and arranged to travel from the from the open position to the closed position by the flow of a fluid in the fluid path from the inlet to the outlet.

27. A microfluidic system as in claim 1, wherein the first closing member has an open position and a closed position and comprises a flap disposed along the fluid path between the inlet and the outlet, the microfluidic system further comprising a seat constructed and arranged to support the flap such that the flap rests on the seat in the closed position.

28. A microfluidic system as in claim 1, wherein the first closing member has an open position and a closed position, and is positioned in the closed position at rest.

29. A microfluidic system as in claim 1, wherein the first closing member has an open position and a closed position, and is positioned in the open position at rest.

30. A microfluidic system as in claim 1, wherein the first closing member comprises two or more flaps.

31. A microfluidic system as in claim 30, wherein the two or more flaps are constructed and arranged to close against one another.

* * * * *